US011048932B2

(12) United States Patent
Batra et al.

(10) Patent No.: US 11,048,932 B2
(45) Date of Patent: Jun. 29, 2021

(54) TRANSFORMATION OF HAND-DRAWN SKETCHES TO DIGITAL IMAGES

(71) Applicant: Adobe Inc., San Jose, CA (US)

(72) Inventors: Vineet Batra, Delhi (IN); Matthew David Fisher, San Carlos, CA (US); Ankit Phogat, Noida (IN)

(73) Assignee: Adobe Inc., San Jose, CA (US)

(*) Notice: Subject to any disclaimer, the term of this patent is extended or adjusted under 35 U.S.C. 154(b) by 113 days.

(21) Appl. No.: 16/551,025

(22) Filed: Aug. 26, 2019

(65) Prior Publication Data
US 2021/0064858 A1 Mar. 4, 2021

(51) Int. Cl.
| G06K 9/46 | (2006.01) |
| G06K 9/00 | (2006.01) |
| G06N 3/08 | (2006.01) |
| G06K 9/62 | (2006.01) |
| G06T 11/20 | (2006.01) |

(52) U.S. Cl.
CPC ....... *G06K 9/00409* (2013.01); *G06K 9/4671* (2013.01); *G06K 9/6256* (2013.01); *G06N 3/08* (2013.01); *G06T 11/203* (2013.01)

(58) Field of Classification Search
CPC ............. G06K 9/00409; G06K 9/6256; G06K 9/4671; G06T 11/203; G06N 3/08
See application file for complete search history.

(56) References Cited

U.S. PATENT DOCUMENTS

| 7,522,310 | B2* | 4/2009 | Wiesenberg | H04N 1/387 |
| | | | | 358/1.18 |
| 2006/0244751 | A1* | 11/2006 | Kitora | H04N 1/32593 |
| | | | | 345/501 |
| 2012/0051655 | A1* | 3/2012 | Oto | G06K 9/481 |
| | | | | 382/199 |
| 2013/0044945 | A1* | 2/2013 | Nykyforov | G06K 9/325 |
| | | | | 382/165 |

OTHER PUBLICATIONS

He K et al., "Deep residual learning for image recognition", arXiv:1512.03385v1, Dec. 10, 2015, 12 pages.

(Continued)

*Primary Examiner* — Christopher M Brandt
(74) *Attorney, Agent, or Firm* — Finch & Maloney PLLC

(57) ABSTRACT

Techniques are disclosed for generating a vector image from a raster image, where the raster image is, for instance, a photographed or scanned version of a hand-drawn sketch. While drawing a sketch, an artist may perform multiple strokes to draw a line, and the resultant raster image may have adjacent or partially overlapping salient and non-salient lines, where the salient lines are representative of the artist's intent, and the non-salient (or auxiliary) lines are formed due to the redundant strokes or otherwise as artefacts of the creation process. The raster image may also include other auxiliary features, such as blemishes, non-white background (e.g., reflecting the canvas on which the hand-sketch was made), and/or uneven lighting. In an example, the vector image is generated to include the salient lines, but not the non-salient lines or other auxiliary features. Thus, the generated vector image is a cleaner version of the raster image.

13 Claims, 18 Drawing Sheets

(56) References Cited

OTHER PUBLICATIONS

Isola P et al., "Image-to-image translation with conditional adversarial networks", arXiv:1611.070043v3, Nov. 26, 2018, 17 pages.
Miyato T et al., "Spectral normalization for generative adversarial networks", arXiv:1802.05957v1, Feb. 16, 2018, 26 pages.
Simo-Serra E et al., "Real-Time Data-Driven Interactive Rough Sketch Inking", AMC Transactions on Graphics, vol. 37, Aug. 2018, 14 pages.
Simo-Serra E et al., "Learning to simplify: fully convolutional networks for rough sketch cleanup", SIGGRAPH' 16 Technical Paper, Jul. 2016, 11 pages.
Ulyanov D et al., "Instance normalization: The missing ingredient for fast stylization", arXiv:1607.08022v3, Nov. 6, 2017, 6 pages.
Zhang H et al., "Self-attention generative adversarial networks", arXiv:1805.08318v2, Jun. 14, 2019, 10 pages.

\* cited by examiner 502a
(Vector image with salient features, and without auxiliary features)

506a
(Raster image with salient features and with auxiliary features)

512a
(Vector image with salient features, and without auxiliary features)

516a
(Raster image with salient features and with auxiliary features)

Image 516b'

Image 530b1

Image 530b2

Image 530b3

TRANSFORMATION OF HAND-DRAWN SKETCHES TO DIGITAL IMAGES

FIELD OF THE DISCLOSURE

This disclosure relates generally to image processing, and more specifically to techniques for transforming hand-drawn sketches to digital images.

BACKGROUND

Graphic designers oftentimes initially express creative ideas as freehand sketches. Consider, for example, the art of logo and icon design, although any number of other graphic designs can of course be hand sketched. In any such cases, the hand-drawn sketches can be subsequently converted to the digital domain as vector images. In the resulting vector images, the underlying geometry of the hand sketch is commonly represented by Bezier curves or segments. However, this transition from paper to digital is a cumbersome process, as traditional vectorization techniques are unable to distinguish intentionally drawn lines from inherent noise present in such hand-drawn sketches. For instance, a pencil drawing tends to have lines that are rough or otherwise relatively non-smooth compared to the precision of machine-made lines, and a standard vectorization process will attempt to vectorize all that unintended detail (noise). As such, the conversion to digital of a relatively simple pencil sketch that can be ideally fully represented by 100 or fewer Bezier segments will result in a very large number (e.g., thousands) of Bezier segments. The problem is further exacerbated by surface texture and background artefacts, even after adjusting several vectorization parameters. As such, the generated vector image may contain excessive and unwanted geometry. To this end, there exist a number of non-trivial issues in efficiently transforming hand-drawn sketches to digital images.

DETAILED DESCRIPTION

Figure 1:
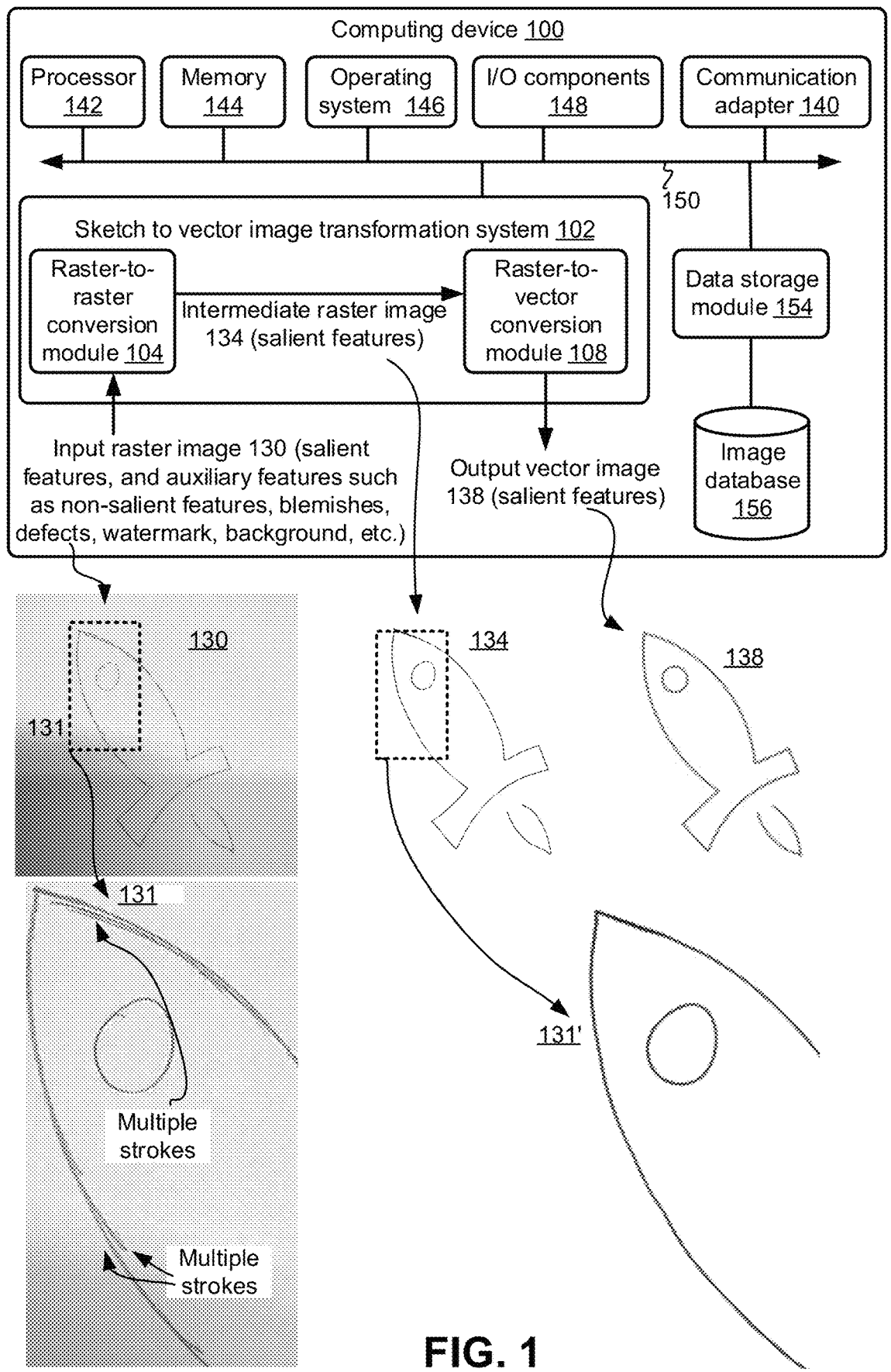
FIG. 1 is a block diagram schematically illustrating selected components of an example computing device configured to transform an input raster image of a hand-drawn sketch comprising salient features and auxiliary features to an output vector image comprising only the salient features, in accordance with some embodiments of the present disclosure.

Techniques are disclosed for transforming an input raster image to a corresponding output vector image. The input raster image is a digital representation of a hand-drawn sketch on paper, such as a scan or photograph. The paper version of the hand-drawn sketch can include any number of lines intended by the artist, along with any number of artefacts of the sketching process that are effectively extraneous with respect to the intended lines. These intended lines and extraneous features are also captured in the input raster image. The input raster image may also include other extraneous features, such as paper background and ambient or flash-based light. These intended and extraneous features are respectively referred to herein as salient features (intended) and auxiliary features (extraneous). For example, the input raster image has salient and auxiliary features, where the salient features are the lines representative of the artist's original intent, and the auxiliary features include non-salient or otherwise extraneous features such as redundant strokes, blemishes, paper background, and ambient lighting. In any case, the output vector image resulting from the transformation process is effectively a clean version of the input raster image, in that the vector image is free from the unintended auxiliary features, and includes only the salient features.

The terms "sketch" and "line drawing" are used interchangeably herein. In an example, a sketch herein refers to a drawing that comprises distinct straight and/or curved lines placed against an appropriate background (e.g., paper, canvas, or other physical medium), to represent two-dimensional or three-dimensional objects. Although the hand-drawn sketches discussed herein may have some color or shading in an example, a hand-drawn sketch herein is assumed to have salient lines or strokes of the artist. Accordingly, the input raster image is also assumed to have those same salient lines or strokes of the artist. The hand-drawn sketch corresponding to the input raster image can be drawn using any appropriate drawing medium such as pen, pencil, marker, charcoal, chalk, and/or other drawing medium, and can be over any appropriate canvas, such as paper (e.g., paper with any appropriate quality, color, type and/or surface texture), drawing board, fabric-based canvas, or other physical medium.

Typically, hand-drawn sketches have auxiliary features, such as non-salient features. For example, an artist may stroke over the same line multiple times, thereby generating multiple adjacent lines in close proximity or at least partially overlapping lines. Thus, the input raster image will also have the same multiple adjacent or at least partially overlapping lines. In any such cases, it can be assumed that the artist intended to generate a single line, such that a primary one of such multiple lines can be considered a salient feature or a salient line, and one or more other adjacent or partially overlapping lines are considered as non-salient features or non-salient lines (or auxiliary features or lines). Thus, the input raster image has salient features, which are representative of the artist's intent, as well as non-salient or auxiliary features such as redundant lines, blemishes, defects, watermarks, non-white and/or non-uniform background, non-uniform lighting condition, and/or other non-salient features. As noted above, non-salient or auxiliary features may further include features not directly provided by the artist's stroke, such as features in a background of the raster image. In an example, an artist may draw the sketch on colored paper, or on paper that is crumpled. The input raster image may show or otherwise manifest such color or crumple background, although such unintended background need not be reproduced in the output vector image, according to some embodiments. In other words, such background is recognized as non-salient or auxiliary.

The techniques may be embodied in any number of systems, methodologies, or machine-readable mediums. In some embodiments, a sketch to vector image transformation system receives the input raster image comprising the salient features and also possibly one or more auxiliary features. A raster-to-raster conversion module of the system generates an intermediate raster image that preserves the salient features of the input raster image, but removes the auxiliary features from the input raster image. A raster-to-vector conversion module of the system generates the output vector image corresponding to the intermediate raster image. Thus, the output vector image captures the salient features of the hand-drawn sketch, but lacks the unintended auxiliary features of the hand-drawn sketch. In this manner, the output vector image is considered to be a "clean" version of the hand-drawn sketch. Also, as the output vector image does not have to capture the auxiliary features of the hand-drawn sketch, the output vector is relatively smaller in size (e.g., compared to another output vector image that captures both salient and auxiliary features of the hand-drawn sketch). For instance, the output vector image is represented by fewer Bezier segments than if the auxiliary features were not removed by the sketch to vector image transformation system, according to an embodiment. In some such embodiments, the raster-to-raster conversion module (e.g., which is to receive the input raster image having the salient and auxiliary features, and generate the intermediate raster image with only the salient features) is implemented using a deep learning network having a generator-discriminator structure. For example, the generator uses a residual block architecture and the discriminator uses a generative adversarial network (GAN), as will be further explained in turn.

Training techniques are also provided herein, for training a raster-to-raster conversion module implemented using a deep learning network. In some embodiments, for example, a training data generation system is provided to generate training data, which is used to train the deep learning network of the raster-to-raster conversion module. In some such embodiments, the training data includes a plurality of vector images having salient features, and a corresponding plurality of raster images having salient and auxiliary features. A diverse set of raster images having salient and auxiliary features are generated synthetically from the plurality of vector images having salient features. Put differently, the training data includes (i) the plurality of vector images having salient features, and (ii) a plurality of raster images having salient and auxiliary features, where the plurality of raster images are synthesized from the plurality of vector images.

In some such embodiments, to synthesize the training data, an initial style dataset is formed. This relatively small style dataset can be then used to generate a larger training data set. To form the relatively small style dataset, one or more image capture devices (e.g., a scanner, a camera) scan and/or photograph a relatively small number of hand-drawn sketches to generate a corresponding number of raster images, where the hand-drawn sketches are drawn by one or more artists from a corresponding number of vector images. Thus, the style dataset includes multiple pairs of images, each pair including (i) a vector image, and (ii) a corresponding raster image that is a digital version (e.g., scanned or photographed version) of a corresponding hand-drawn sketch mimicking the corresponding vector image. As the raster images of the style dataset are digital versions of hand-drawn sketches, the raster images of the style dataset include salient features, as well as auxiliary features.

After the style dataset is generated, the style dataset is used to synthesize a relatively large number of raster images from a corresponding large number of vector images. For example, a patch synthesis module of the training data generation system synthesizes the relatively large number of raster images from the corresponding large number of vector images using the style dataset. The relatively "large number" here is many-fold (e.g., at least 10×, 1000×, 2000×, or the like) compared to the relatively "small number" of the style dataset (e.g., 50 image pairs). In some embodiments, using the image style transfer approach (or image analogy approach), the relatively large number of raster images are synthesized from the corresponding number of vector images. Because (i) the raster images are synthesized based on the image style transfer approach using the style dataset and (ii) the raster images of the style dataset include both salient and auxiliary features, the synthesized raster images also include both salient and auxiliary features.

In some such embodiments, an image filtering module of the training data generation system modifies the synthesized raster images, e.g., filters the synthesized raster images to add features such as sharpness, noise, and blur. For example, many practical scanned images of hand-drawn sketches may have artifacts, blemishes, blurring, noise, out-of-focus regions, and the filtering adds such effects to the synthesized raster images. In some embodiments, a background and lighting synthesis module of the training data generation system further modifies the synthesized raster images, to add background and lighting effects. For example, randomly selected gamma correction may be performed on the synthesized raster images (e.g., by the background and lighting synthesis module), to enhance noise signal, vary lighting condition and/or vary stroke intensity in synthesized raster images. In an example embodiment, the background and lighting synthesis module further modifies the synthesized raster images to randomly shift intensity of one or more color-channels, and add randomly selected background images. Such modifications of the synthesized raster images are to make the raster images look similar to realistic raster images that are scanned or photographed versions of real-world hand-drawn sketches, and the modified and synthesized raster images have salient features, as well as auxiliary features such as non-salient features, blemishes, defects, watermark, background, etc. In some embodiments, the modified and synthesized raster images, along with the ground truth vector images (e.g., from which the raster images are synthesized) form the training dataset.

In any such cases, the resulting training dataset can be used to train the deep learning network of the raster-to-raster conversion module of the sketch to vector image transformation system. In some such embodiments, in order to train the generator network to learn salient strokes (e.g., primary inking lines of the artist), a loss function is used, where the loss function includes one or more of pixel loss $L_{pix}$, adversarial loss $L_{adv}$, and min-polling loss $L_{pool}$, each of which will be discussed in detail in turn.

System Architecture and Example Operation

FIG. 1 is a block diagram schematically illustrating selected components of an example computing device 100 (also referred to as device 100) configured to transform an input raster image 130 of a hand-drawn sketch comprising salient features and auxiliary features to an output vector image 138 comprising the salient features, in accordance with some embodiments. FIG. 1 also illustrates an example of the input raster image 130 received by a sketch to vector image transformation system 102 (also referred to as image translation system, or simply as system 102) of the device 100, an example intermediate raster image 134 generated by the system 102, and an example output vector image 138 output by the system 102.

As can be seen, the device 100 includes the sketch to vector image transformation system 102, which is capable of receiving the input raster image 130. The input raster image 130 has salient features, as well as auxiliary features such as one or more of non-salient features, blemishes, defects, watermarks, background, and/or one or more other auxiliary features. The system 102 generates the output vector image 138, which is a vector image representation of the salient features of the input raster image 130, as will be discussed in further detail in turn.

In some embodiments, the input raster image 130 is a scanned or photographed version of a hand-drawn sketch or line drawing. For example, an image capture device (e.g., a scanner, a camera), which is communicatively coupled with the system 100, scans or photographs the hand-drawn sketch or line drawing, to generate the input raster image 130. The image recognition device transmits the input raster image 130 to the system 100. Thus, the input raster image 130 is a raster image representative of a hand-drawn sketch or line drawing. As previously discussed, the terms "sketch" and "line drawing" are used interchangeably. The hand-drawn sketch can be drawn using any appropriate drawing medium such as pen, pencil, marker, charcoal, chalk, or other drawing medium. The hand-drawn sketch can be drawn over any appropriate canvas, such as paper (e.g., paper of any appropriate quality, color, type and/or surface texture), drawing board, fabric-based canvas, or another appropriate canvas.

The input raster image 130 has salient features that represents the intent of the artist drawing the sketch. However, often, in addition to such salient features, such hand-drawn sketches may have auxiliary features, such as non-salient features. For example, an artist may stroke over the same line multiple times, thereby generating multiple adjacent lines in close proximity, or multiple partially or fully overlapping lines. Thus, the input raster image 130 may have multiple proximate lines, where the artist may have intended to generate a single line—one such line is considered as a salient feature or a salient line, and one or more other such proximately located or adjacent lines are considered as non-salient features or non-salient lines. For example, FIG. 1 illustrates a magnified view of a section 131 of the example input raster image 130—as seen, the section 131 of the input raster image 130 has multiple strokes on individual portions of the input raster image 130. Such multiple strokes occur often occur in hand-drawn sketches.

Thus, the input raster image 130 has salient features, as well as auxiliary features such as non-salient lines, blemishes, defects, watermarks, and/or background. The salient features are representative of true intent of the artist. For example, an artist may draw the sketch on a colored paper, or a paper that is crumpled. The input raster image 130 will show such background of the paper or the creases formed in the paper due to the crumpling of the paper, although such unintended background catachrestic of the canvas (e.g., the paper) need not be reproduced in the output vector image 138. For example, as seen in FIG. 1, the background of the image 130 has color and lighting effect (e.g., some section of the background is darker than other section of the background), which may occur in photographed or scanned image of hand-drawn sketch in a canvas such as paper. For example, non-uniform lighting condition of the image 130 can occur when the hand-drawn sketch is photographed (e.g., using a camera of a mobile phone) while the hand-drawn sketch is exposed to non-uniform light.

In some embodiments, the system 102 receives the input raster image 130 comprising the salient features, and also possibly comprising auxiliary features such as one or more of non-salient features, blemishes, defects, watermarks, and/or background. A raster-to-raster conversion module 104 of the system 102 generates an intermediate raster image 134 that preserves the salient features of the input raster image 130, but removes the auxiliary features from the input raster image 130. For example, non-salient features, blemishes, defects, watermarks, background, and/or any other auxiliary features are not present in the intermediate raster image 134.

For example, FIG. 1 illustrates a magnified view of a section 131' of the example intermediate raster image 134—as seen, the section 131' of the intermediate raster image 134 has salient features, but does not include the non-salient features (e.g., does not include the multiple strokes). Thus, multiple strokes on individual portions of the input raster image 130 is replaced by corresponding single line in the intermediate raster image 134. Furthermore, the non-white background of the input raster image 130 is replaced in the intermediate raster image 134 with a clean, white background.

Subsequently, a raster-to-vector conversion module 108 of the sketch to vector image transformation system 102 generates the output vector image 138 corresponding to the intermediate raster image 134. FIG. 1 also illustrates an example of the output vector image 138. As the output vector image 138 is generated from the intermediate raster image 134, the output vector image 138 also does not have the multiple strokes of the input raster image 130. That is, the output vector image 138 is based on the salient features of the input raster image 130, and hence, is a true representation of the artist's intent. The output vector image 138 does not include the unintentional or unintended features of the input raster image 130, such as the auxiliary features including one or more of non-salient features, blemishes, defects, watermark, and/or background of the input raster image 130. If the output vector image were to include the auxiliary features, the resultant output vector image would have many redundant Bezier curves, would have relatively larger storage size and would include the defects of the input raster image 130 (discussed herein later with respect to FIG. 8). In contrast, the output vector image 138 generated by the system 102 does not include the unintentional or unintended auxiliary features of the input raster image 130, and hence, is a clean version of the input raster image 130, as variously discussed herein.

As will be appreciated, the configuration of the device 100 may vary from one embodiment to the next. To this end, the discussion herein will focus more on aspects of the device 100 that are related to facilitating generation of clean vector images from raster images, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can display images and allow to transform raster images to vector images.

In the illustrated embodiment, the device 100 includes one or more software modules configured to implement certain functionalities disclosed herein, as well as hardware configured to enable such implementation. These hardware and software components may include, among other things, a processor 142, memory 144, an operating system 146, input/output (I/O) components 148, a communication adaptor 140, data storage module 154, an image database 156, and the sketch to vector image transformation system 102. A bus and/or interconnect 150 is also provided to allow for inter- and intra-device communications using, for example, communication adaptor 140. Note that in an example, components like the operating system 146 and the sketch to vector image transformation system 102 can be software modules that are stored in memory 144 and executable by the processor 142. In an example, at least sections of the sketch to vector image transformation system 102 can be implemented at least in part by hardware, such as by Application-Specific Integrated Circuit (ASIC). The bus and/or interconnect 150 is symbolic of all standard and proprietary technologies that allow interaction of the various functional components shown within the device 100, whether that interaction actually take place over a physical bus structure or via software calls, request/response constructs, or any other such inter and intra component interface technologies.

Processor 142 can be implemented using any suitable processor, and may include one or more coprocessors or controllers, such as an audio processor or a graphics processing unit, to assist in processing operations of the device 100. Likewise, memory 144 can be implemented using any suitable type of digital storage, such as one or more of a disk drive, solid state drive, a universal serial bus (USB) drive, flash memory, random access memory (RAM), or any suitable combination of the foregoing. Operating system 146 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 148, such as one or more of a tactile keyboard, a display, a mouse, a touch sensitive display, a touch-screen display, a trackpad, a microphone, a camera, scanner, and location services. The image database 156 stores images, such as various raster images and/or vector images discussed herein. In general, other componentry and functionality not reflected in the schematic block diagram of FIG. 1 will be readily apparent in light of this disclosure, and it will be appreciated that the present disclosure is not intended to be limited to any specific hardware configuration. Thus, other configurations and subcomponents can be used in other embodiments.

Also illustrated in FIG. 1 is the sketch to vector image transformation system 102 implemented on the device 100. In an example embodiment, the system 102 includes the raster-to-raster conversion module 104, and the raster-to-vector conversion module 108, as variously discussed herein previously and as will be discussed in further detail in turn. In an example, the components of the system 102 are in communication with one another or other components of the device 102 using the bus and/or interconnect 150, as previously discussed. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the system 102 may be implemented in any application that allows transformation of digital images, including, but not limited to, ADOBE® ILLUSTRATOR®, ADOBE® LIGHTROOM®, ADOBE PHOTOSHOP®, ADOBE® SENSEI®, ADOBE® CREATIVE CLOUD®, and ADOBE® AFTER EFFECTS® software. "ADOBE," "ADOBE ILLUSTRATOR", "ADOBE LIGHTROOM", "ADOBE PHOTOSHOP", "ADOBE SENSEI", "ADOBE CREATIVE CLOUD", and "ADOBE AFTER EFFECTS" are registered trademarks of Adobe Systems Incorporated in the United States and/or other countries.

Figure 2:
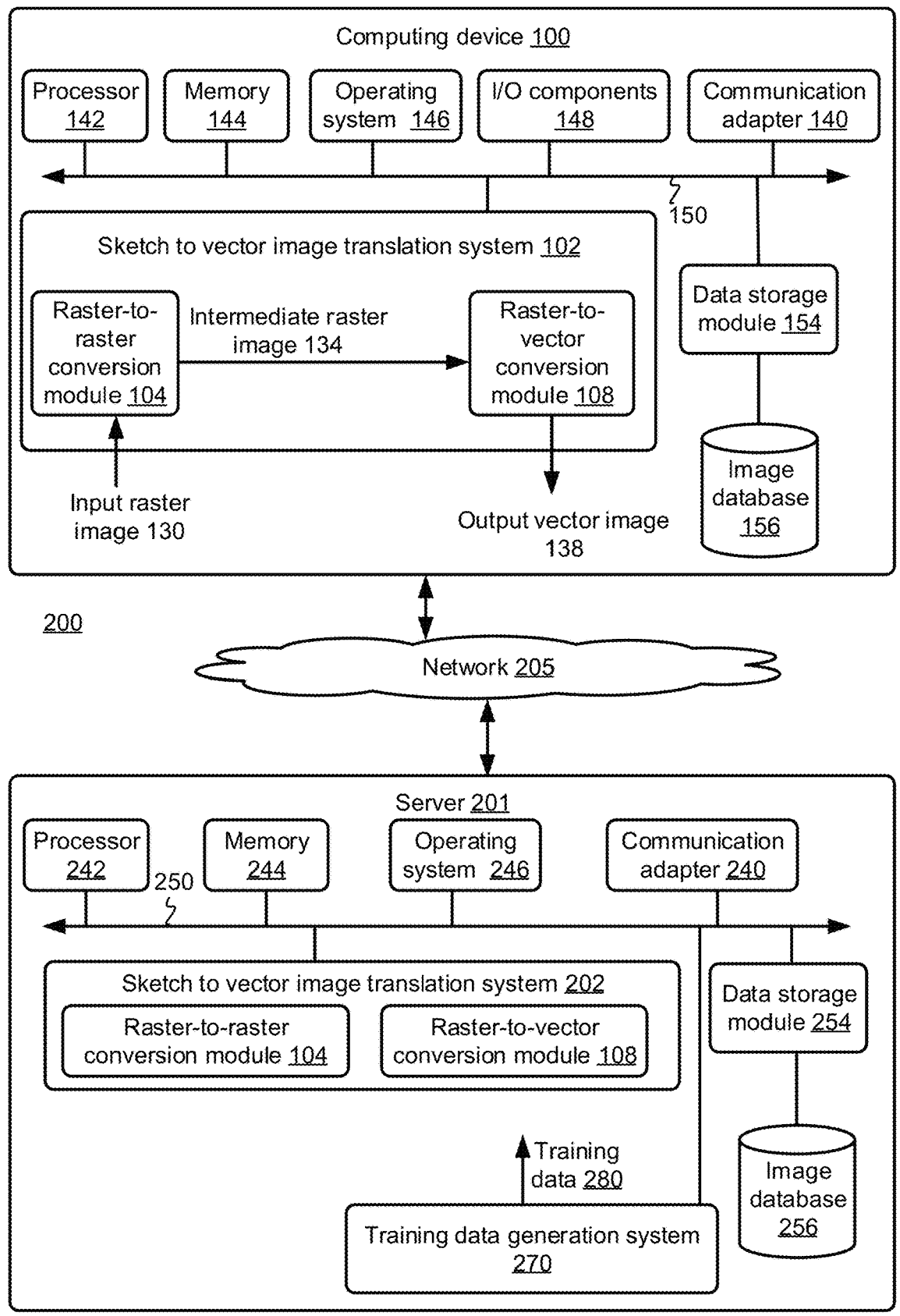
FIG. 2 is a block diagram schematically illustrating selected components of an example system comprising the computing device of FIG. 1 communicating with server device(s), where the combination of the device and the server device(s) are configured to transform the input raster image of the hand-drawn sketch comprising salient features and auxiliary features to the output vector image comprising the salient features, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to transform the input raster image 130 of a hand-drawn sketch or line drawing comprising salient features and auxiliary features to the output vector image 138 comprising the salient features, in accordance with some embodiments.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide image translation services, as variously described herein. Examples of such services include receiving from the device 100 input comprising the input raster image 130, generating the intermediate raster image 134 and subsequently the output vector image 138, and transmitting the output vector image 138 to the device 100 for displaying on the device 100, as explained below. Although one server 201 implementing a sketch to vector image translation system 202 is illustrated in FIG. 2, it will be appreciated that, in general, tens, hundreds, thousands, or more such servers can be used to manage an even larger number of image translation functions.

In the illustrated embodiment, the server 201 includes one or more software modules configured to implement certain of the functionalities disclosed herein, as well as hardware configured to enable such implementation. These hardware and software components may include, among other things, a processor 242, memory 244, an operating system 246, the sketch to vector image translation system 202 (also referred to as system 202), data storage module 254, image database 256, and a communication adaptor 240. A bus and/or interconnect 250 is also provided to allow for inter- and intra-device communications using, for example, communication adaptor 240 and/or network 205. Note that components like the operating system 246 and sketch to vector image translation system 202 can be software modules that are stored in memory 244 and executable by the processor 242. The previous relevant discussion with respect to the symbolic nature of bus and/or interconnect 150 is equally applicable here to bus and/or interconnect 250, as will be appreciated.

Processor 242 is implemented using any suitable processor, and may include one or more coprocessors or controllers, such as an audio processor or a graphics processing unit, to assist in processing operations of the server 201. Likewise, memory 244 can be implemented using any suitable type of digital storage, such as one or more of a disk drive, a universal serial bus (USB) drive, flash memory, random access memory (RAM), or any suitable combination of the foregoing. Operating system 246 may comprise any suitable operating system, and the particular operating system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. The image database 256 stores images, such as various raster images and/or vector images discussed herein. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including digital images such as raster images and/or vector images. As shown, the server 201 includes the sketch to vector image translation system 202 that communicates with the system 102 on the client device 100. In an example, the sketch to vector image translation system 102 discussed with respect to FIG. 1 can be implemented in FIG. 2 exclusively by the sketch to vector image translation system 102, exclusively by the sketch to vector image translation system 202, and/or may be shared between the sketch to vector image translation systems 102 and 202. Thus, in an example, none, some, or all image translation features are implemented by the sketch to vector image translation system 202.

For example, when located in the server 201, the sketch to vector image translation system 202 comprise an application running on the server 201 or a portion of a software application that can be downloaded to the device 100. For instance, the system 102 can include a web hosting application allowing the device 100 to interact with content from the sketch to vector image translation system 202 hosted on the server 201. In this manner, the server 201 generates output vector images based on input raster images and user interaction within a graphical user interface provided to the device 100.

Thus, the location of some functional modules in the system 200 may vary from one embodiment to the next. For instance, while the raster-to-raster conversion module 104 can be on the client side in some example embodiments, it may be on the server side (e.g., within the system 202) in other embodiments. Various raster and/or vector images discussed herein can be stored exclusively in the image database 156, exclusively in the image database 256, and/or may be shared between the image databases 156, 256. Any number of client-server configurations will be apparent in light of this disclosure. In still other embodiments, the techniques may be implemented entirely on a user computer, e.g., simply as stand-alone sketch to vector image translation application.

In some embodiments, the server 201 (or another one or more servers communicatively coupled to the server 201) includes a training data generation system 270, which is used to generate training data 280 for training the system 102 and/or the system 202. For example, the training data 280 includes a plurality of vector images having salient features, and a corresponding plurality of raster images having salient and auxiliary features. As will be discussed herein in turn, a diverse set of the plurality of raster images having salient and auxiliary features are generated synthetically from the plurality of vector images having salient features, thereby forming the training data 280.

Figure 3:
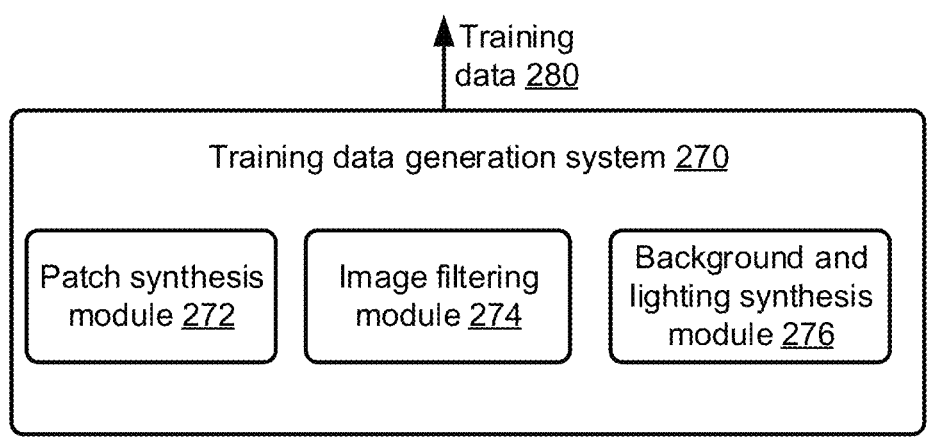
FIG. 3 is a block diagram schematically illustrating a training data generation system used to generate training data for training a sketch to vector image transformation system of FIGS. 1 and/or 2, in accordance with some embodiments of the present disclosure.

FIG. 3 is a block diagram schematically illustrating the training data generation system 270 of FIG. 2 that is used to generate the training data 280 for training the sketch to vector image transformation systems 102 and/or 202, in accordance with some embodiments. In some embodiments, the training data generation system 270 includes a patch synthesis module 272, an image filtering module 274, and a background and lighting synthesis module 276, each of which will be discussed in turn.

The training data generation system 270 builds the training data 280 that includes a large collection of diverse sketches aligned closely with corresponding digital representations. For example, the training data 280 includes (i) a first vector image having salient features, and a corresponding synthetically generated first raster image having salient and auxiliary features, (ii) a second vector image having salient features, and a corresponding synthetically generated second raster image having salient and auxiliary features, and so on. Thus, the training data 280 includes a plurality of pairs of images, each pair including a vector image having salient features, and a corresponding synthetically generated raster image having salient and auxiliary features, where the raster image is generated form the corresponding vector image. That is, the training data 280 includes a plurality of vector images having salient features, and a corresponding plurality of raster images having salient and auxiliary features.

The images included in the training data 280 are also referred to as training images. Thus, the training data 280 includes a plurality of training vector images having salient features, and a corresponding plurality of training raster images having salient and auxiliary features.

In some embodiments, the vector images of the training data 280 pre-exists (i.e., the training data generation system 270 need not generate the vector images of the training data 280), and the training data generation system 270 synthetically generates the raster images of the training data 280 from the vector images.

In an example, one or more artists can arguably hand-draw sketches from the vector images of the training data 280 (e.g., such that the hand-draw sketches have salient and auxiliary features), and then the hand-drawn sketches can be scanned or photographed to generate the raster images of the training data 280. However, the training data 280 includes tens of thousands, hundreds of thousands, or even more image pairs, and it is cost and/or time prohibitive to generate the large number of raster images of the training data 280—hence, the training data generation system 270 synthetically generates the raster images of the training data 280.

Figure 4:
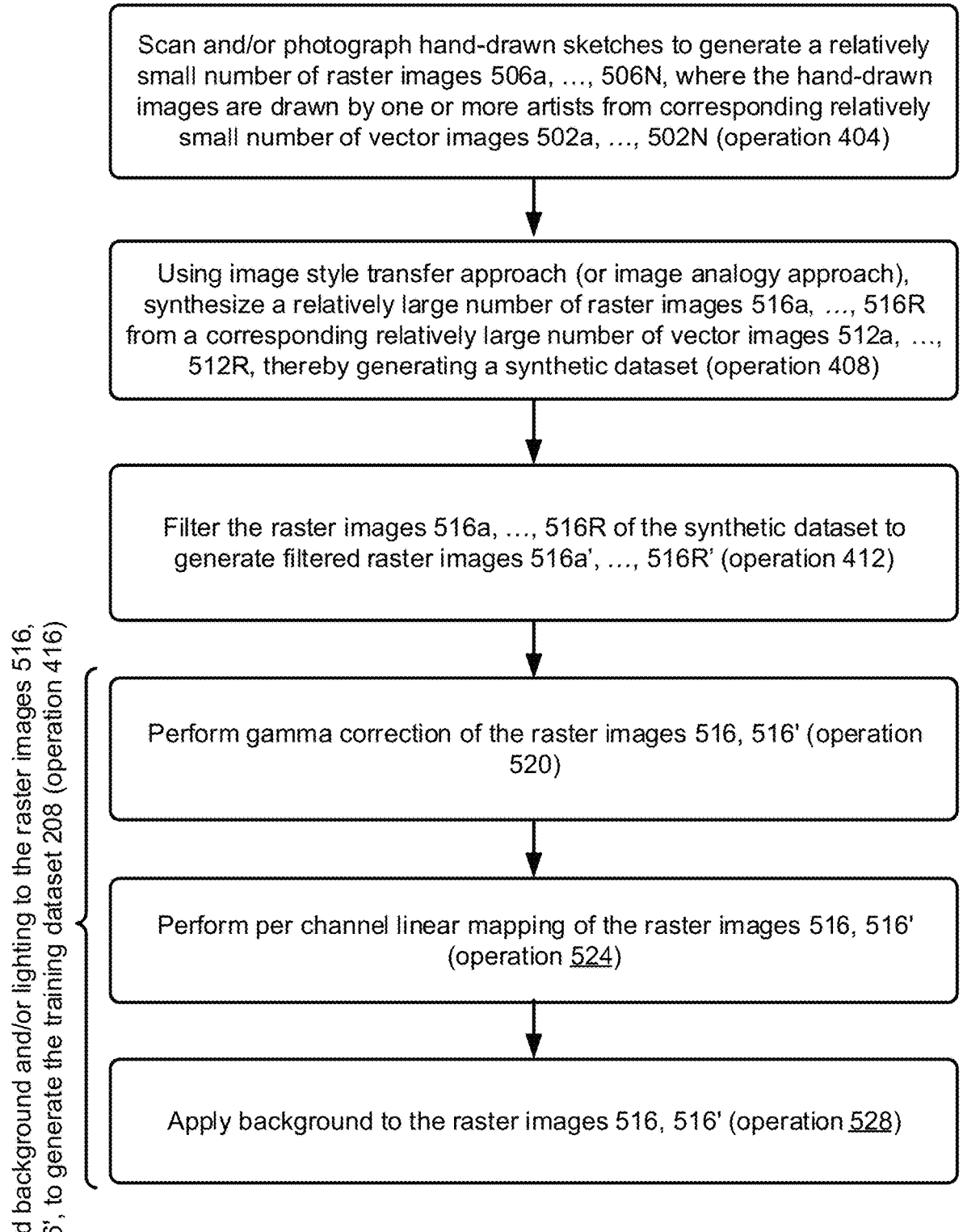
FIG. 4 is a flowchart illustrating an example method for generating the training data, in accordance with some embodiments of the present disclosure.

FIG. 4 is a flowchart illustrating an example method 400 for generating the training data 280, in accordance with some embodiments. FIGS. 5A-5K illustrate example images depicting various operations of the method 400, in accordance with some embodiments. FIGS. 5A-5K and FIG. 4 will be discussed herein in unison. Method 400 can be implemented, for example, using the system architecture illustrated in FIGS. 1, 2 and/or 3, and described herein. However other system architectures can be used in other embodiments, as apparent in light of this disclosure. To this end, the correlation of the various functions shown in FIG. 4 to the specific components and functions illustrated in FIGS. 1-3 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate patch synthesis, and a second server may provide the image filtering, during generation of the training data 280. Thus, although various operations of the method 400 are discussed herein as being performed by the training data generation system 270 of the server 201, one or more of these operations can also be performed by any other server, or even by the device 100.

At 404 of the method 400, a small number of hand-drawn sketches are scanned and/or photographed to generate a corresponding small number of raster images 506a, . . . , 506N, where the hand-drawn sketches are drawn by one or more artists from a corresponding small number of vector images 502a, . . . , 502N. For example, one or more image capture devices (e.g., one or more scanners and/or one or more cameras), which are in communication with the system 100, scan and/or photograph the small number of hand-drawn sketches, to generate the raster images 506a, . . . , 506N. The "small number" of operation 400 is small or less relative to a number of raster images included in the training data 280. Merely as an example, about 100,000 raster images are included in the training data 280, whereas about 50 raster images 506a, . . . , 506N are generated in the operation 404. For example, the "small number" of 404 is at least 100 times, 1,000 times, or 2,000 times less than a number of raster images included in the training data 280.

Figure 5A:
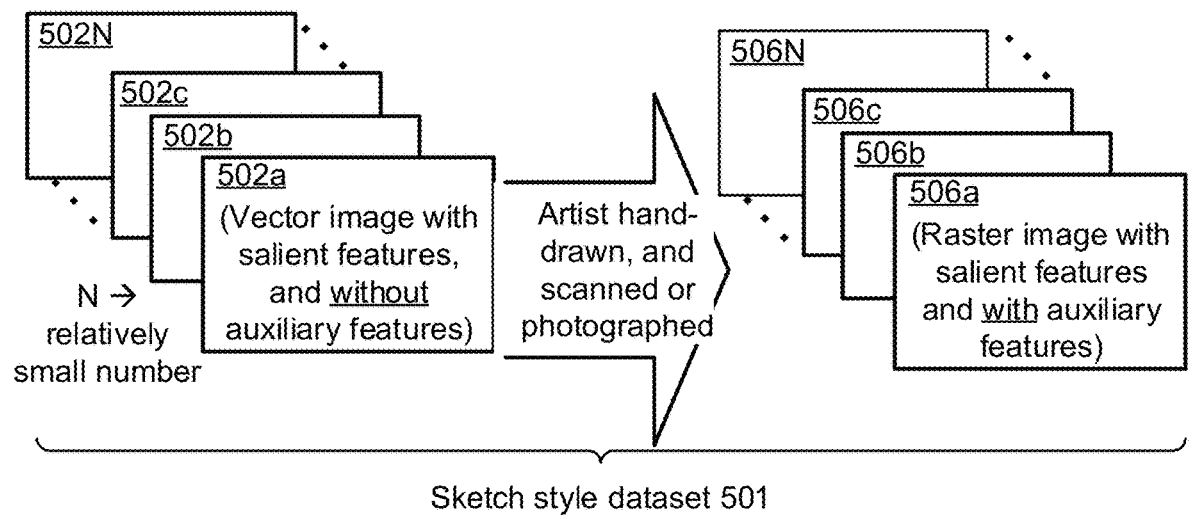
FIGS. 5A-5K illustrate example images depicting various operations of the example method of FIG. 4, in accordance with some embodiments of the present disclosure.

For example, FIG. 5A illustrates the operation 404, where vector images 502a, . . . , 502N are used (e.g., copied, traced, mimicked) by one or more artists to generate hand-drawn sketches, where the hand-drawn sketches are scanned and/or photographed to generate the raster images 506a, . . . , 506N. Thus, for example, an image capture device generates the raster image 506a from a first hand-drawn sketch of the vector image 502a, the image capture device (or a different image capture device) generates the raster image 506b from a second hand-drawn sketch of the vector image 502b, and so on. Elements referred to herein with a common reference label followed by a particular number or alphabet may be collectively referred to by the reference label alone. For example, images 502a, 502b, . . . , 502N may be collectively and generally referred to as images 502 in plural, and image 502 in singular. Thus, each raster image 506 is a scanned or photographed version of a corresponding hand-drawn sketch, where the hand-drawn sketch aims to mimic (e.g., trace or copy) a corresponding vector image 502.

The images 502 are vector images with salient features and without auxiliary features. The images 506 are raster images with salient features and auxiliary features. For example, as the images 506 are digital version of hand-drawn sketches, the images 506 possibly have the auxiliary features, such as one or more of non-salient lines, blemishes, defects, watermarks, background, as discussed with respect to FIG. 1. To cover a variety of the raster images 506, various sketching media, such as pencils, pens, markers, charcoal, ink, are used to draw the sketches corresponding to the images 506. Similarly, the sketches are drawn on a variety of canvas, such as paper (e.g., various types of paper, slightly crumpled paper, papers with various surface textures, paper with some background and/or watermark), drawing board, fabric canvas. Although the vector images 502a, . . . , 502N (e.g., N vector images) are used to generate the raster images 506a, . . . , 506N (e.g., N raster images), the number of vector images 502 and raster images 506 need not be equal—for example, a single vector image 502 may be used to generate more than one raster image 506, as discussed with respect to FIG. 5B.

Figure 5B:
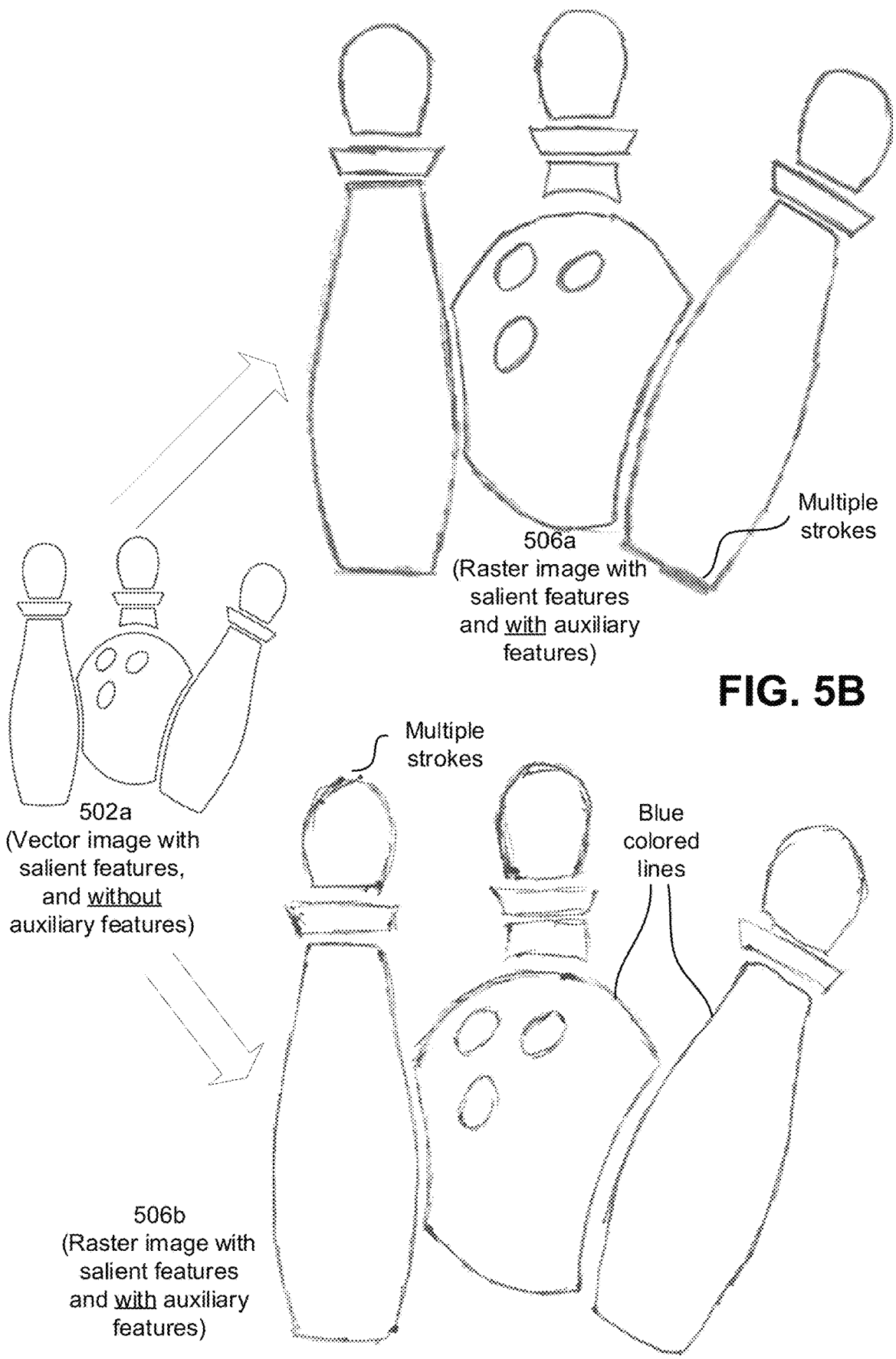

FIG. 5B illustrates an example of a vector image 502a, and two raster images 506a and 506b generated from hand-drawn sketches of the vector image 502a. For example, raster image 506a is a scanned (or photographed) version of a hand-sketch drawn by an artist using pencil to mimic the vector image 502a, and raster image 506b is a scanned (or photographed) version of a hand-sketch drawn by an artist using blue ink pen to mimic the vector image 502a (although the image 506b of the black-white FIG. 5B is illustrated in black and white, the lines/strokes of the image 506 can be blue in color). The images 506a, 506b are magnified in FIG. 5B (e.g., relative to the image 502a) to illustrate the auxiliary features in these two images, such as multiple strokes, thicker and thinner lines.

The relatively small number of vector images 502a, . . . , 202N and the corresponding raster images 506a, . . . , 506N form a sketch style dataset 501 (also referred to as style dataset 501), labelled in FIG. 5A. Thus, the style dataset 501 includes multiple pairs of images, each pair including a vector image 502 and a corresponding raster image 506. Merely as an example, referring to FIG. 5B, a first pair of the style dataset 501 includes the vector image 502a and the raster image 506a, a second pair of the style dataset 501 includes the vector image 502a and the raster image 506b, and so on.

Figure 5C:
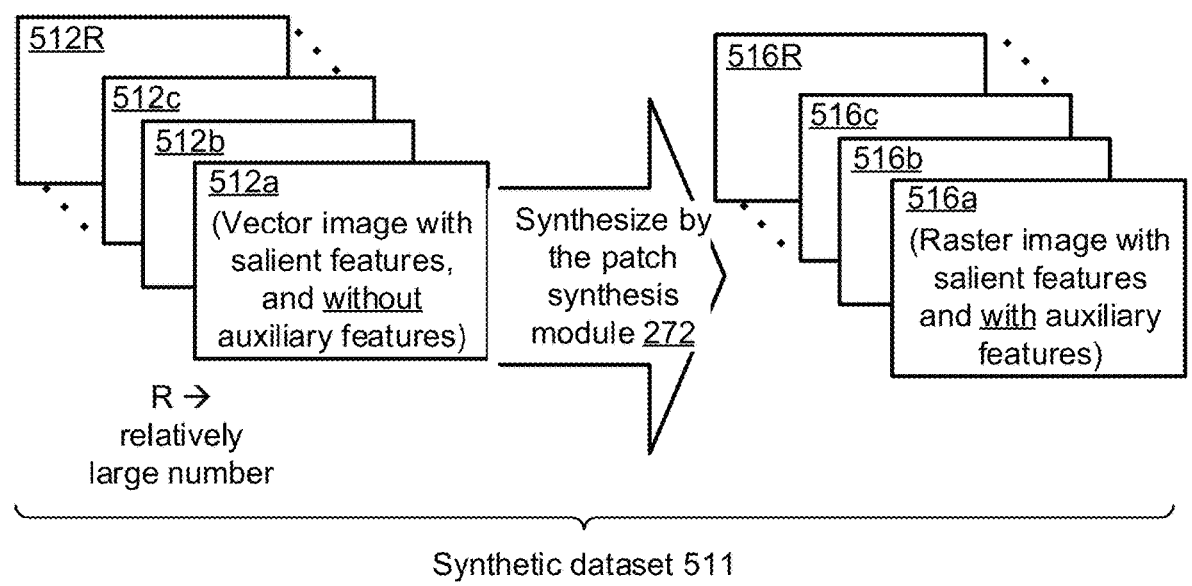

Referring again to FIG. 4, the method 400 then proceeds from 404 to 408, where, using image style transfer approach (or image analogy approach), a patch synthesis module 272 synthesizes a relatively large number of raster images 516a, . . . , 506R from a corresponding large number of vector images 512a, . . . , 512R. Fig example, FIG. 5C illustrates the operation 408 in further detail, where the vector images 512a, . . . , 512R are used by the patch synthesis module 272 to generate the raster images 516a, . . . , 516R. Thus, "R" raster images are generated in operation 408, whereas "N" raster images were generated in operation 404. In an example, R is relatively higher then N. Merely as an example, as previously discussed herein and without limiting the scope of this disclosure, N may be 50 and R may be 100,000 (these example numbers are provided herein to illustrate that R is many-fold higher than N, such as at least 100 times, 10,000 times, or higher). Although the vector images 512a, . . . , 512R are used to synthesize raster images 516a, . . . , 516R, the number of vector images 512 and raster images 516 need not be equal—for example, a single vector image 512 may be used to generate more than one raster image 516. The image dataset comprising the vector images 512 and the corresponding synthesized raster images 516 is also referred to as synthetic dataset 511, as labelled in FIG. 5C.

Figure 5D:
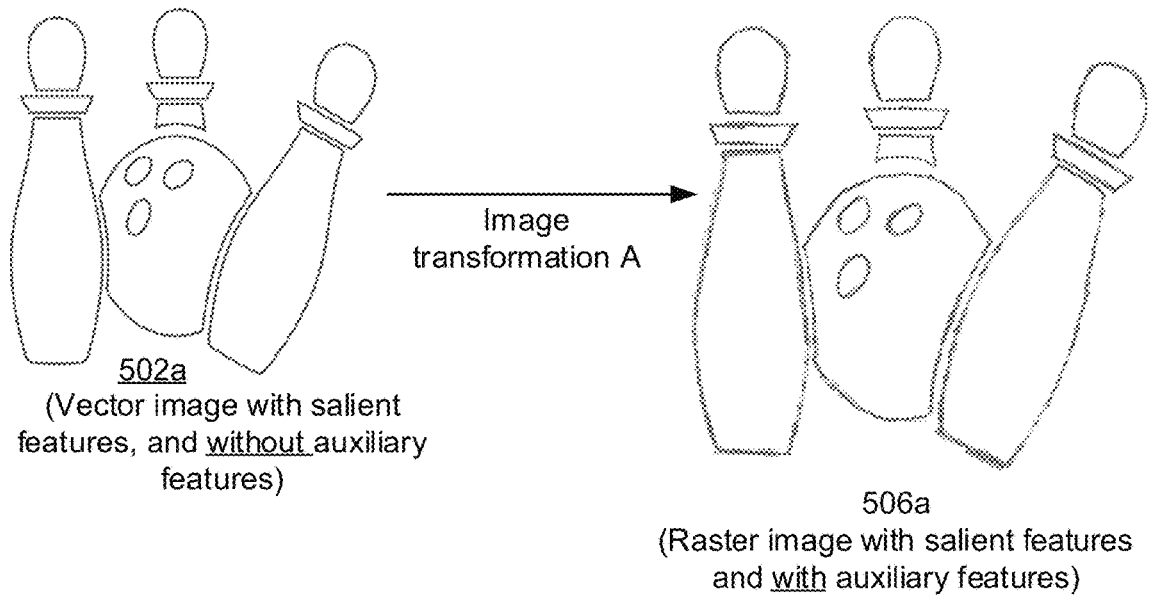
Figure 5D:
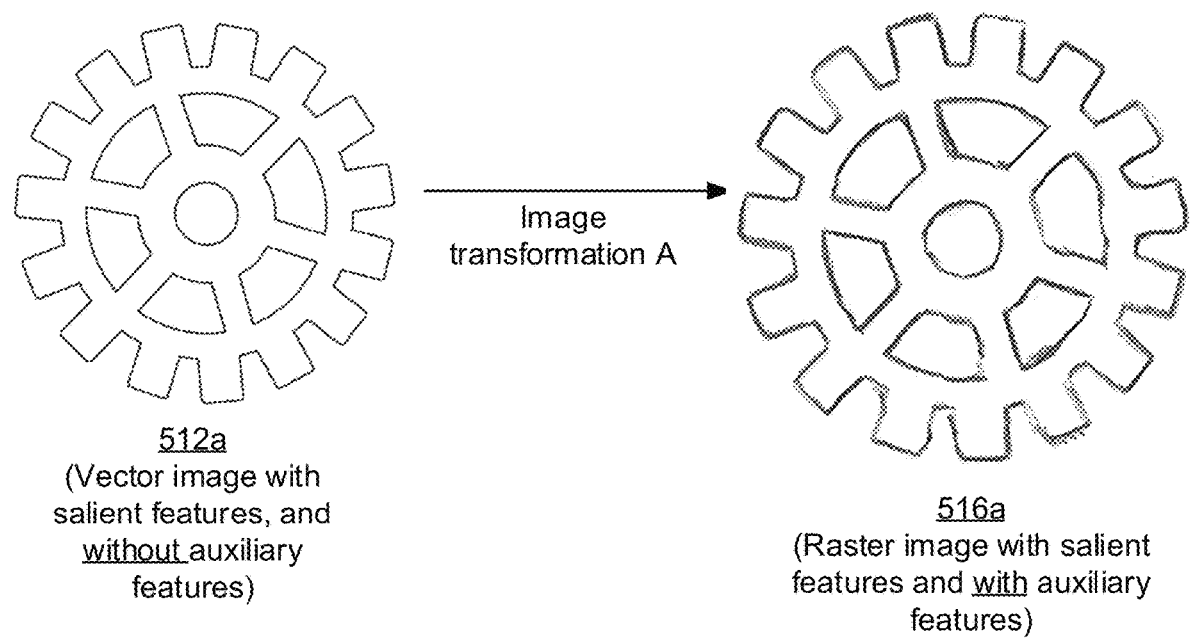

The patch synthesis module 272 synthesizes a raster image 516 from a vector image 512 based on image analogy between the images 502 and images 506. In more detail, in an image pair of the style dataset 501, a vector image 502a is transformed to a corresponding raster image 506a using an image transformation, and that same image transformation is subsequently applied to synthesize a raster image 516a from a corresponding vector image 512a. For example, FIG. 5D illustrates an image transformation "A" from the vector image 502a to the raster image 506a (e.g., where generation of the raster image 506a is discussed with respect to operation 404 and FIGS. 5A-5B), and the same image transformation "A" is used to synthesize raster image 516a from the vector image 512a. The raster image 516a is magnified to illustrate imperfections or auxiliary features in the raster image 516a. So, in one example operation according to an embodiment, the patch synthesis module 272 randomly selects an image pair in the style dataset 501, such as the image pair including the vector image 502a and the corresponding raster image 506a. The patch synthesis module 272 then determines an image transformation "A" and transforms the vector image 502a to the corresponding raster image 506a. The patch synthesis module 272 then applies the same image transformation "A" to the vector image 512a to synthesize the raster image 516a, as illustrated in FIG. 5D, as will be further discussed in turn.

Figure 5E:
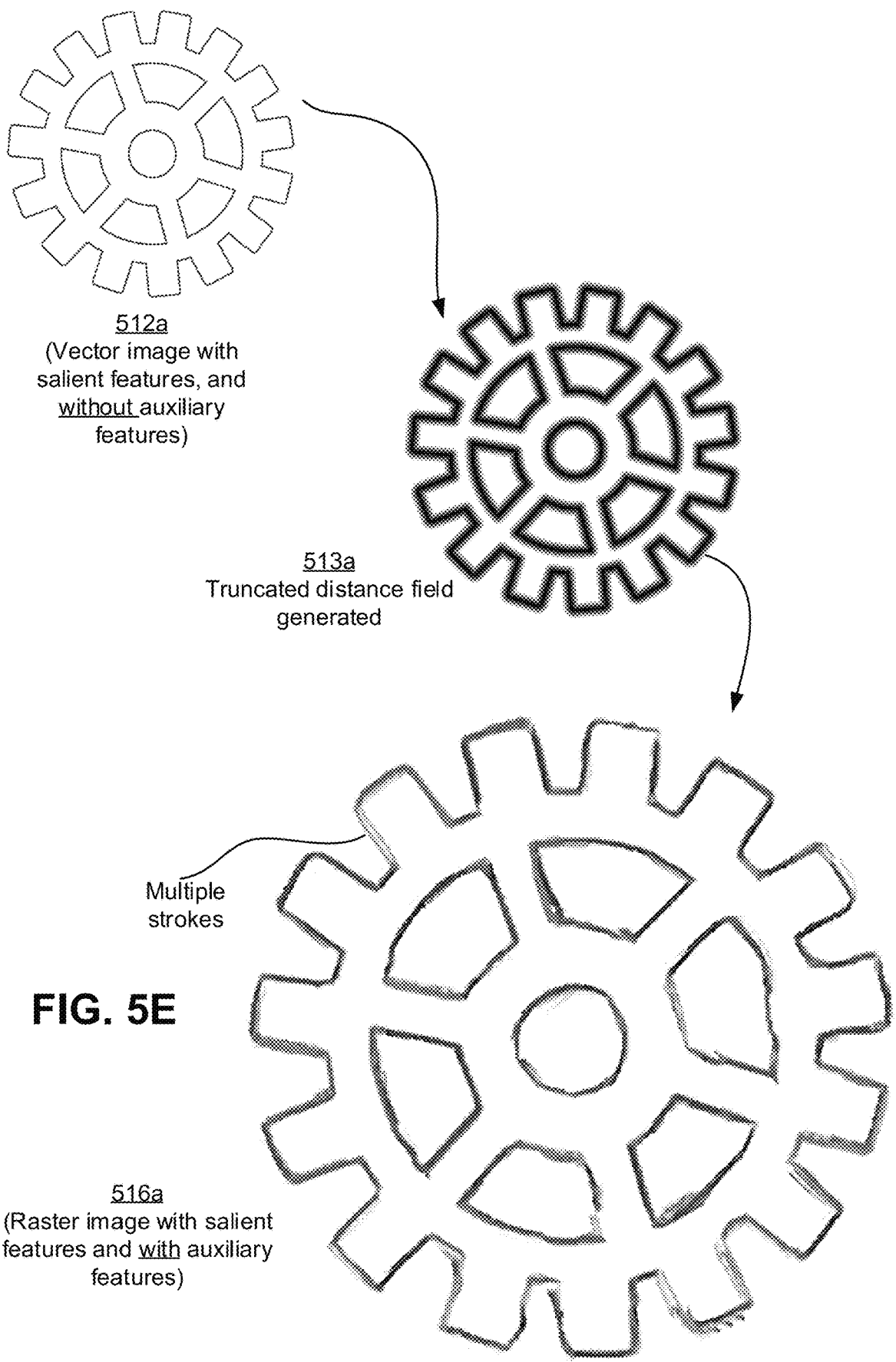

Thus, operations at 408 perform a style transfer approach to restyle the large set of vector images 512, e.g., using randomly chosen aligned pairs from the style dataset 501, which allows synthesis of a large set of raster images from a corresponding set of vector images. In some embodiments, the synthesis operation at 408 is performed in two sub-operations, as illustrated in FIG. 5E. In more detail, from a vector image 512, a truncated distance field of the vector image is computed (e.g., by the patch synthesis module 272) as the patch descriptor for both the source and target images. An image 513a of FIG. 5E illustrates the truncated distance field of the vector image 512a. The truncation of the signed distance field is at a fixed distance corresponding to the expected maximum stroke thickness for the given medium. That is, individual lines of various strokes in the image 513 are thicker, and correspond to a maximum permissible stroke thickness for the given drawing medium. For example, if a thick marker is to be used as a drawing medium, the individual lines (e.g., the truncation value) will be relatively thicker or higher; and if a regular pen or pencil is to be used as a medium, the individual lines (e.g., the truncation value) will be relatively thinner or smaller. Thus, the truncation value is determined empirically based on the drawing medium (e.g. a wider distance field is used for pencil sketches or sketches using thick marker, as to compared to sketches drawn by pen).

So, for instance, and according to an example embodiment, if it is desired that the synthesized raster image 516a is to mimic a drawing drawn using a relatively thick marker, then the patch synthesis module 272 selects a higher truncation value. On the other hand, if it is desired that the synthesized raster image 516a is to mimic a drawing drawn using a relatively thin pen, then the patch synthesis module 272 selects a lower truncation value. In some such embodiments, the patch synthesis module 272 selects a type of drawing medium (e.g., a marker, a pencil, a pen, or another drawing medium) to be used for the drawing to be synthesized, and assigns an appropriate truncation value based on the drawing medium. Such selection of the drawing medium can be random.

In some other such embodiments, the patch synthesis module 272 selects the type of drawing (e.g., marker, pencil, pen, or another drawing medium) based on the type of drawing medium used for the raster image 506a. For example, as discussed with respect to FIG. 5D, the image transformation "A" transforms the vector image 502a to the raster image 506a. Because the same image transformation is to be applied to the vector image 512a to synthesize the raster image 516a, the truncation value is based on drawing medium of the raster image 506a. In other words, the truncation value is based on a thickness of lines in the raster image 506a.

Then the stroke styles are synthesized from a reference example (e.g., from an image pair of the style data set 501, such as image transformation "A" from the vector image 502a to the raster image 506a) to synthesize the raster image 516a, such that the raster image 516a has a similar stroke style as the reference raster image 502a of the style dataset 501. Thus, a stroke style analogy between vector image 502a and raster image 506a of the style dataset 501 is used to synthesize raster image 516a from corresponding vector image 512a. For example, now the raster image 516a is analogous or otherwise related to the vector image 512a in the same way as the raster image 506a is analogous or related to the vector image 502a.

In further detail, an image analogy problem can be defined as follows. Given (i) a pair of reference images P and P' (which are the unfiltered and filtered versions of the same image) and (ii) an unfiltered target image Q, the problem is to synthesize a new filtered image Q' such that: {P:P'::Q:Q'}, where the ":" operator indicates a manner in which images P and P' are related or analogous (or a manner in which images Q and Q' are related or analogous), and the operator "::" indicates that the image the transformation between images P and P' is same as the transformation between images Q and Q'. For the example of FIG. 5D, images P and P' are vector image 502a and raster image 506a, respectively, and images Q and Q' are vector image 512a and raster image 516a, respectively.

Thus, stroke style analogy between vector image 502a and raster image 506a is used to synthesize the raster image 516a from the vector image 512a. As such, now the synthesized raster image 516a and the reference raster image 506a have similar stroke styles. For instance, as illustrated in FIG. 5D, note that both the raster images 506a and 516a have similar redundant non-salient strokes, in addition to the salient strokes. For example, non-salient strokes in a section of the synthesized raster image 516a can be similar to non-salient strokes in a section of the reference raster image 502a. In this manner, the synthesized raster image 516a is a filtered version of the vector image 512a, and has at least in part a similar stroke style as the raster image 506a.

In some embodiments, to increase the variation in the synthetic dataset 511, linear interpolations may be performed on the output raster images 516 created with two different styles. For example, according to some such embodiments, the patch synthesis module 272 interpolates the sketch styles of two images 506a and 506b (e.g., which are sketches drawn using pencil and blue-ink pen, respectively), to synthesize a raster image 516 of the synthetic dataset 511. Thus, the synthesized raster image 516 will include sketch styles of the two images 506a and 506b. Although such sketches are somewhat atypical (such as a sketch that is done with both a red and black ink pen, and also a pencil), the increased variety improves the robustness of the sketch processing network (i.e., the trained raster-to-raster conversion module 104).

Figure 5F:
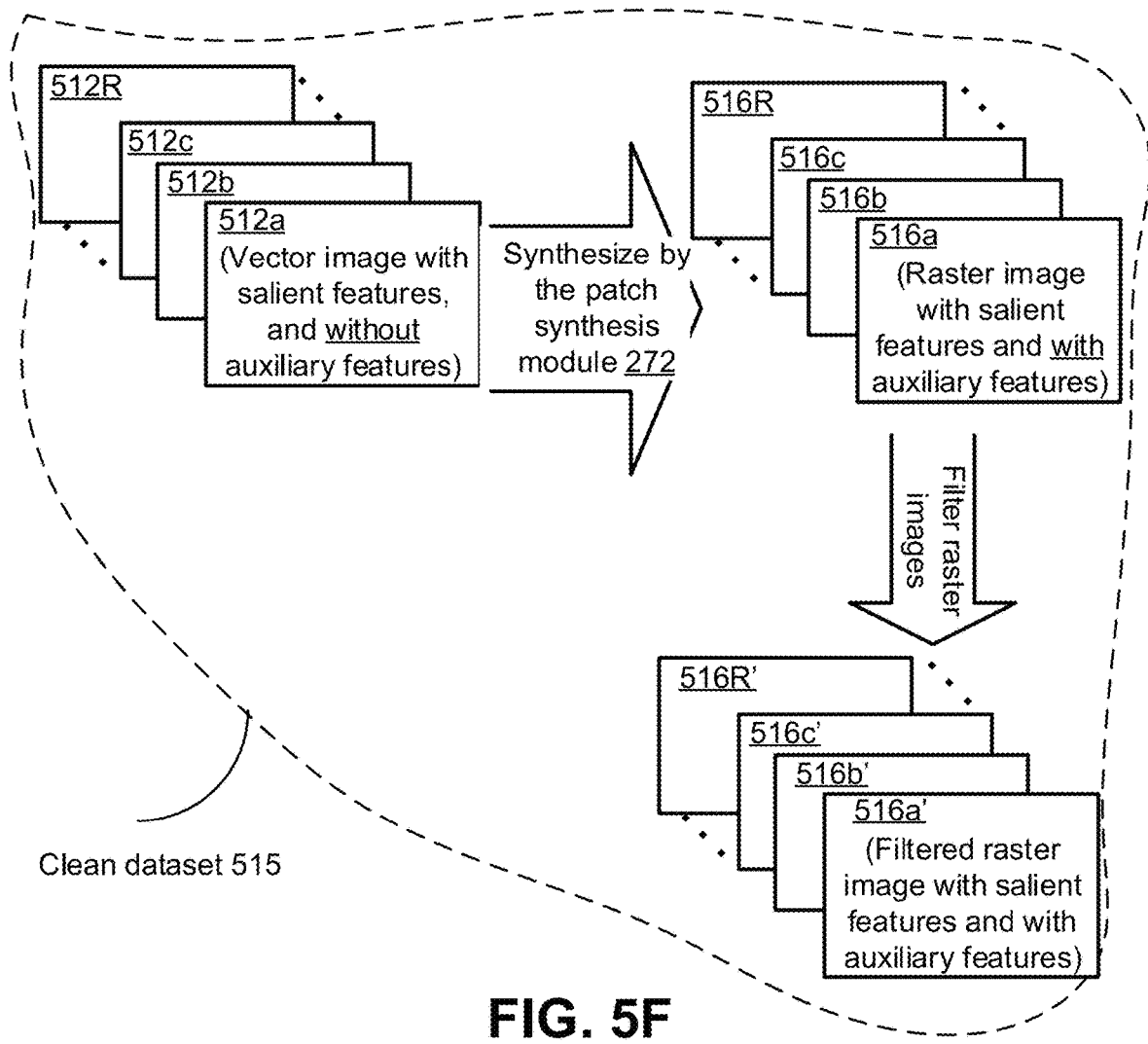

Referring again to FIG. 4, the method 400 proceed from 408 to 412, where the raster images 516a, . . . , 516R of the synthetic dataset are filtered (e.g., by the image filtering module 274 of FIG. 3) to generate filtered raster images 516a', . . . , 516R'. The image filtering module 274 performs the filtering to further augment the range of synthesized raster images. FIG. 5F illustrates the filtering process to generate filtered raster images 516a', . . . , 516R'. For example, the image filtering module 274 applies a set of image filters, with calibrated set of parameters, to add features such as sharpness, noise, and blur to the clean raster images 516. For example, many practical scanned images of hand-drawn sketches may have artifacts, blemishes, blurring, noise, out-of-focus regions, and the filtering at 412 adds such effects to the raster images 516'.

In some embodiments, the raster images 516, 516' (i.e., raster images prior to filtering, as well as raster images after filtering), along with the ground truth vector images 512, form a clean dataset 515, as illustrated in FIG. 5F. The raster images 516, 516' still have clean background, as the image transformation operations at 408 of method 400 transforms sketch style in the synthesized raster images 516, and does not transform any background or lighting condition to the raster images 516.

Merely as an example and without limiting the scope of this disclosure, the clean dataset 515 has about 5,000 vector images 512, has about 10,000 raster images 516 (e.g., two sets of 5,000 as a random interpolation of two different styles), and has about 10,000 raster images 516' created using the fixed-function image processing filters discussed with respect to operations 412 of method 400. These 20,000 raster images 516, 516' have relatively clean (e.g., white) background and/or uniform lighting condition in an example embodiment. That is, the clean dataset 515 covers a wide range of artistic styles, but does not account for different background and/or lighting variations. Furthermore, the raster images 516, 516' of the clean dataset 515 lacks noise characteristics (such as smudges and/or grain) commonly associated with real-world sketches. To create such variation, these images 516, 516' are composited on top of a corpus of background images in operation 416 of the method 400 of FIG. 4.

Figure 5G:
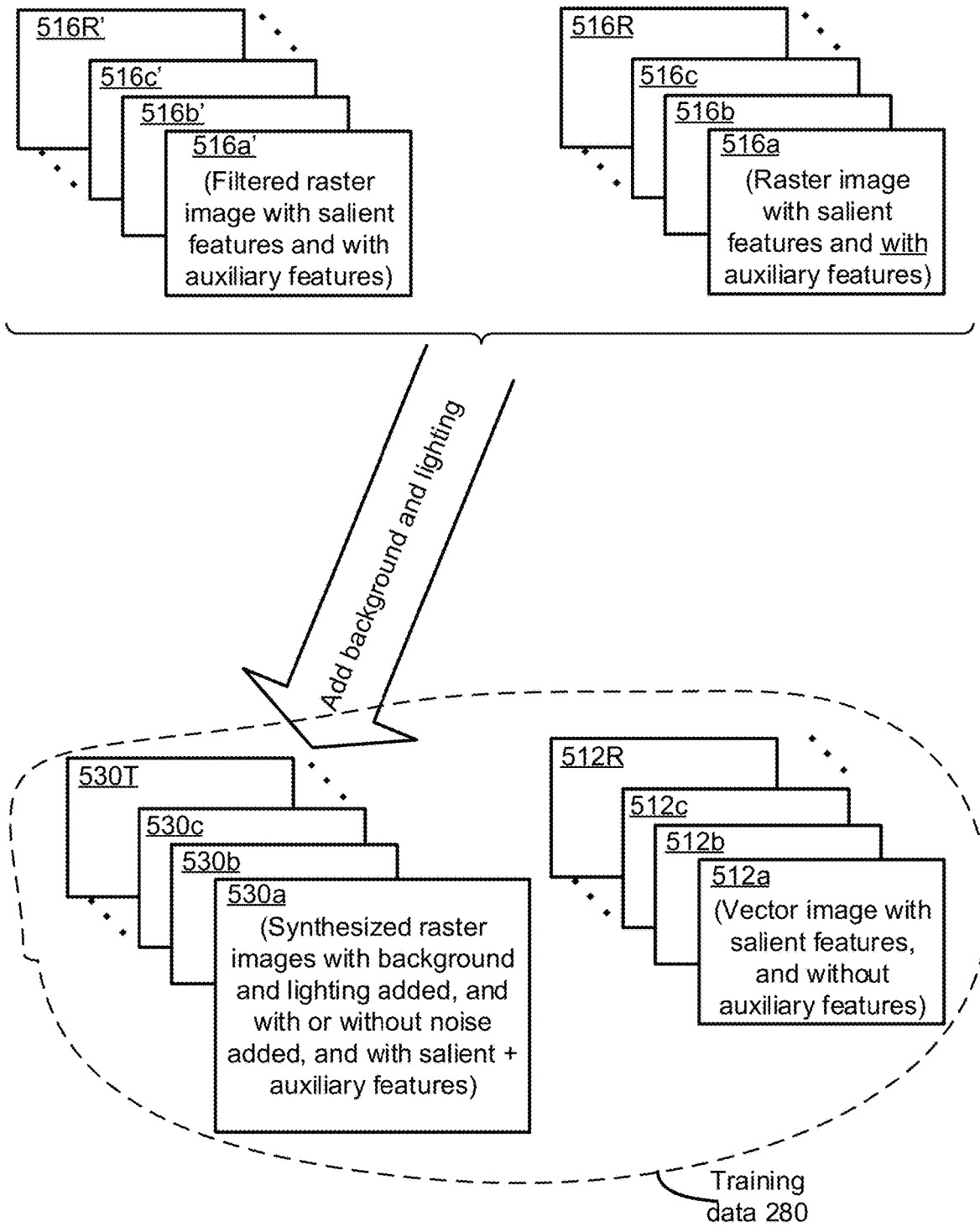

At 416 of the method 400 of FIG. 4, background and lighting are added (e.g., by the background and lighting synthesis module 276 of FIG. 3) to the raster images 516, 516', to generate the training dataset 208. For example, FIG. 5G illustrates generation of raster images 530a, . . . , 530T, by adding background and lighting to the raster images 516, 516'. The raster images 510a, . . . , 510T and corresponding vector images 512a, . . . , 512R form the training dataset 280. The operation 416 comprises multiple sub-operations (e.g., operations 420, 424, 428), and hence, the operation 416 is illustrated at a side, and not within a box, in FIG. 4.

Figure 5H:
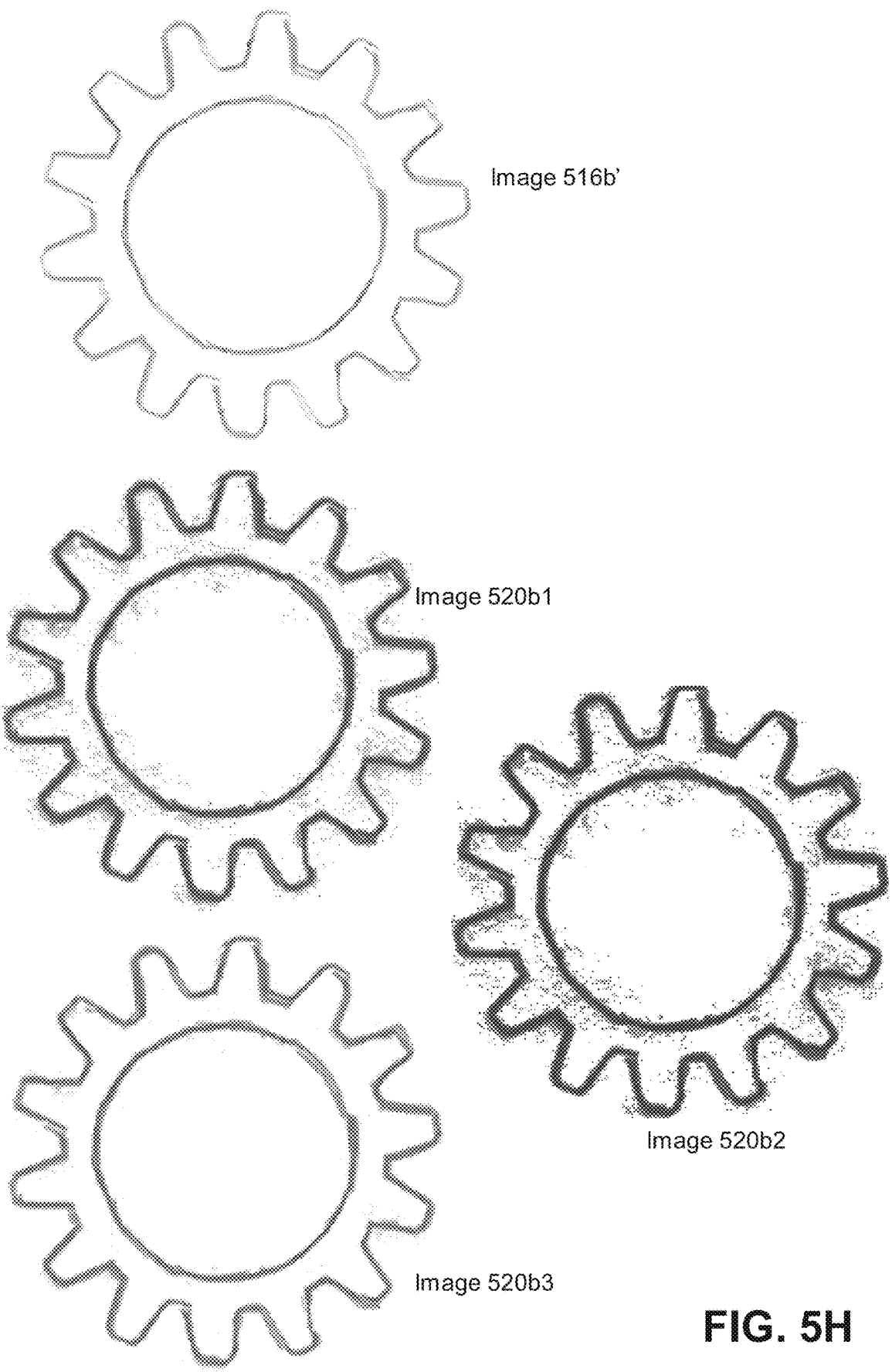

In some embodiments, operation 416 of the method 400 includes, at 420, performing (e.g., by the background and lighting synthesis module 276) a gamma correction operation (e.g., ramping operation) on the raster images 516, 516', e.g., to perform further amplification to enhance noise signal, vary lighting condition and/or vary stroke intensity in synthesized raster images 516, 516'. The gamma correction can make the raster images look lighter or darker, e.g., based on the amount of correction. For example, a raster image I (e.g., individual ones of the raster images 516, 516') is modified as follows:

$$I=1.0-(1.0-I)^{\gamma} \quad \text{Equation 1}$$

where the variable γ is randomly selected for individual raster image from the range of 0.1 to 1. Note that in equation 1, the variable γ is an exponent or power of (1.0−I). Thus, a magnitude of change in each raster image is based on the randomly selected variable γ. FIG. 5H illustrates a raster image 516b', and three images 520b1, 520b2, and 520b3, each of which is generated from the image 516b' based on a corresponding randomly selected value of γ. For example, the image 520b2 is relatively darker (e.g., relatively higher value of gamma γ), and the hence, smudges in the image 520b2 (e.g., which were added during the filtering operation) are relatively prominent, and the salient and non-salient lines are also darker. On the other hand, the image 520b3 is relatively lighter (e.g., relatively lower value of gamma γ), and the hence, smudges in the image 520b2 (e.g., which were added during the filtering operation) are relatively less prominent, and the salient and non-salient lines are also lighter. Thus, the gamma correction results in random amplification of noise (e.g., where the noise were added during the image filtering stage at 412 of method 400).

The value of gamma γ may be selected randomly for correcting different raster images 516, 516'. For example, a first raster image is corrected with a first random value of gamma γ, a second raster image is corrected with a second random value of gamma γ, where the first and second random values are likely to be different in an example embodiment. The gamma correction operation with randomly selected gamma γ ensures that the raster image is randomly made lighter or darker, to mimic the lighting condition of real-life sketches after being photographed or scanned.

The operation 416 of the method 400 further includes, at 424, performing (e.g., by the background and lighting synthesis module 276) per channel linear mapping of the raster images 516, 516'. For example, the intensity of each color channel Ci is randomly shifted or varied, e.g., using an appropriate linear transform, such as:

$$Ci=Ci*\sigma+\beta. \quad \text{Equation 2}$$

Figure 5I:
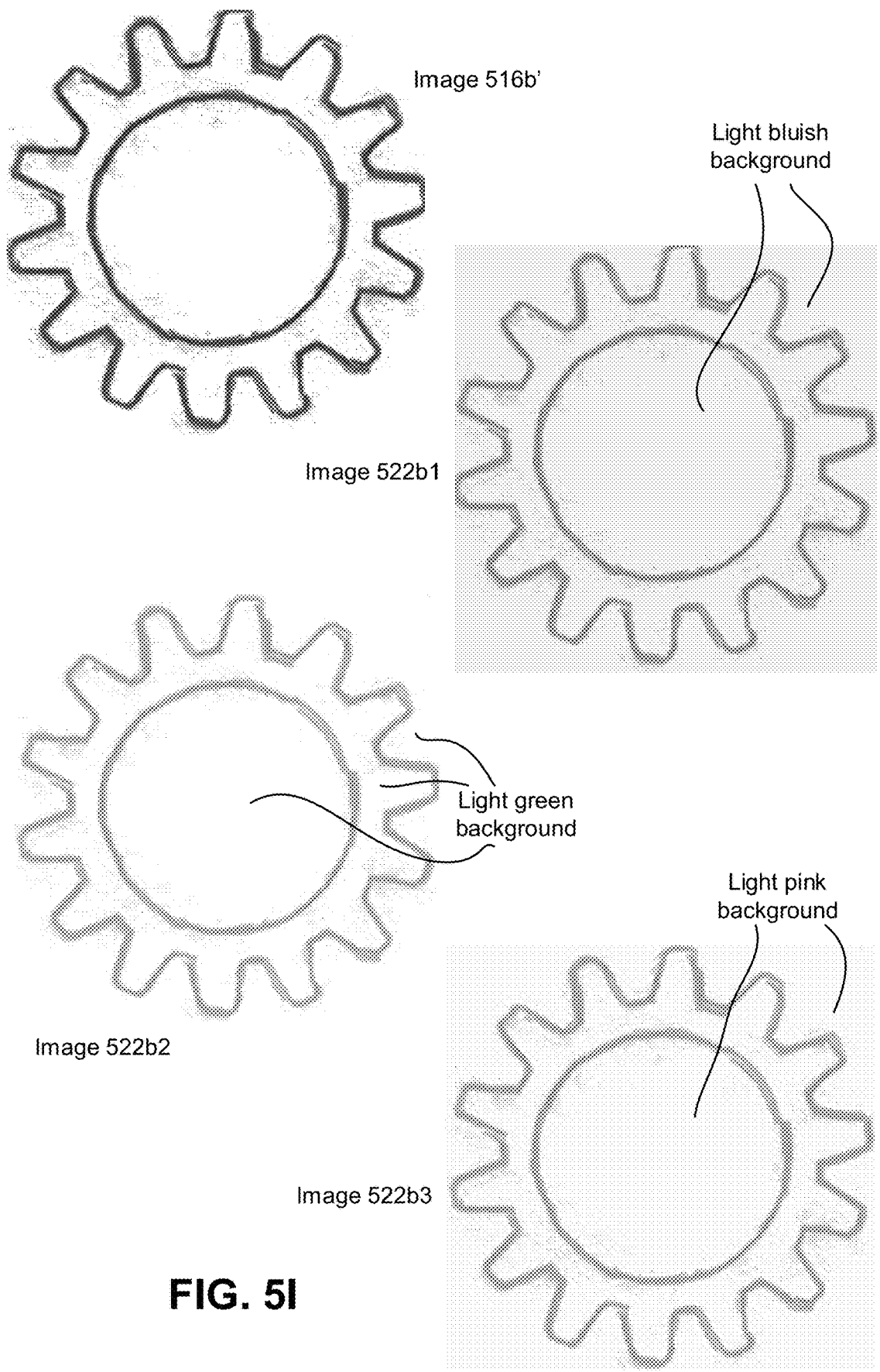

The variable σ is a randomly selected gain and may range between 0.8 and 1.2, for example, and the variable β is a randomly selected bias and may range between −0.2 and 0.2, for example. The variables σ and β are selected randomly for each of red, blue, and green color channels, which provides a distinct color for individual raster images. The background and lighting synthesis module 276 performs the per color channel linear mapping independently on each color channel, and the per color channel linear mapping can produce values that are outside the capture range, which can help the deep learning network to train and learn to generalize even though these values can never be observed. FIG. 5I illustrates four raster images, where image 516b' is a raster image prior to per channel linear mapping, image 522b1 is a first example of the raster image after a first instance of per channel linear mapping, image 522b2 is a second example of the raster image after a different second instance of per channel linear mapping, and image 522b3 is a third example of the raster image after another different third instance of per channel linear mapping. The three images have different color (e.g., which is evident in colored reproduction of the figure) due to the randomness of the variables α and β, which generates different color images for different instances of per channel linear mapping of the same raster image. Although not depicted in the black-white FIG. 5I, the three images can have light bluish, light green, and light pink backgrounds, respectively (e.g., to reflect various lightly colored papers).

Referring again FIG. 4, the operation 416 of the method 400 further includes, at 528, applying randomly selected background images (e.g., by the background and lighting synthesis module 276 of FIG. 3) to the raster images 516, 516'. For example, each of the raster image is composited with a corresponding randomly selected background, where the randomly selected background may be non-white background. That is, a randomly selected background is applied to a raster image. For example, the training data generation system 270 (e.g., the background and lighting synthesis module 276) accumulates a set of candidate high-resolution background images with different shadows and surface details, where the set of candidate high-resolution background images mimics a variety of background or canvass on which real life hand-drawn sketches are made and scanned (or photographed), such as crumpled paper, lightly colored paper, fabric canvas, paper of different variety or quality or surface texture, various lighting conditions, shadows or blemishes generated during the photography or scanning process of real-life hand-drawn sketches, and/or other appropriate background and/or lighting conditions. Merely as an example and without limiting the scope of this disclosure, the set may include 200 candidate high-resolution background images. For each raster image being processed, the background and lighting synthesis module 276 randomly selects a background from the set of candidate background, and takes a random crop of this background image to be equal to the size of raster image. Then the background and lighting synthesis module 276 uses alpha blending to composite the gamma-amplified, per-channel linear-mapped raster image I with the background B to generate an output image O as follows:

$$O = B^* \alpha + I^*(1.0 - \alpha), \quad \text{Equation 3}$$

where per-pixel a value is determined as follows:

$$\alpha = (1 - v)^* I + v. \quad \text{Equation 4}$$

Here in equation 4, the variable v is selected to be between 0 and 0.1. The variable v may be preselected to a fixed value, or may be selected randomly during generation of background for each raster image. The variable v controls how strongly the curves of the raster image masks out the background.

In some embodiments, equations 3 and 4 attempt to mimic how the artist's sketch would overlay on top of the background, ensuring that the white regions of the sketch image are fully or substantially transparent, while the darker regions obscure the underlying background image. Instead of precomputing these composites, these steps are applied independently for each training example drawn from the raster image dataset during the network training process.

Figure 5J:
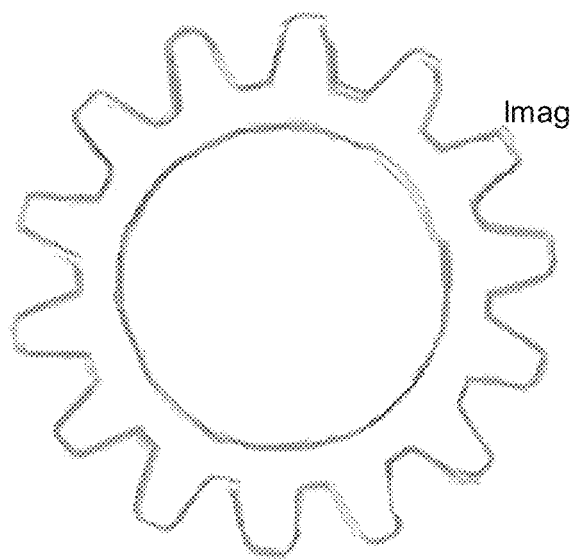
Figure 5J:
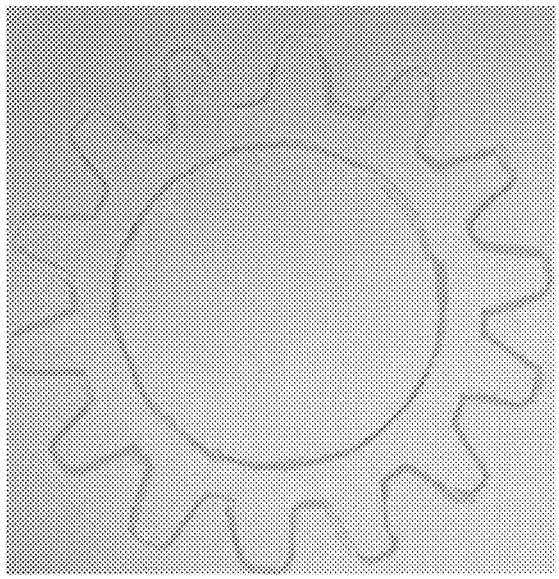
Figure 5J:
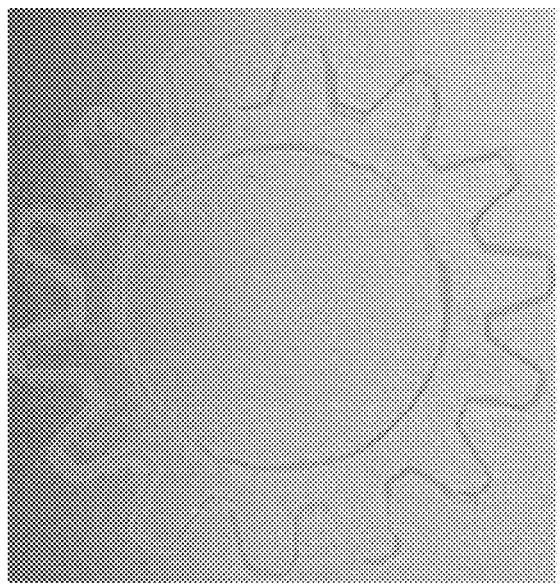
Figure 5J:
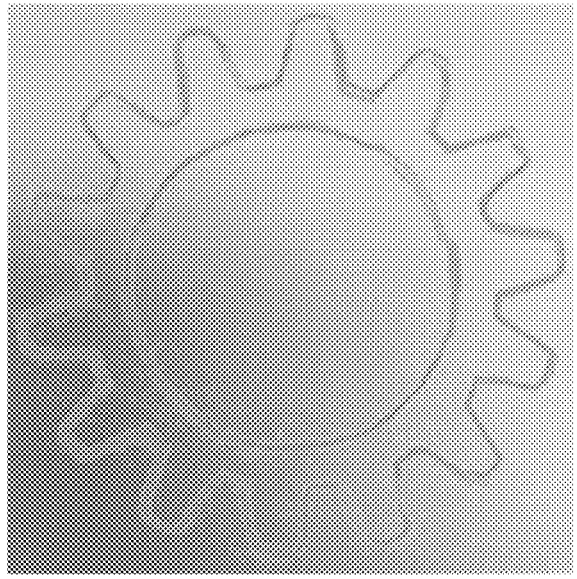

FIG. 5J illustrates four raster images, where image 516b' is a raster image prior to applying the background, image 530b1 is a first example of the raster image after a first instance of applying a first background, image 530b2 is a second example of the raster image after a different second instance of applying a second background, and image 522b3 is a third example of the raster image after another different third instance of applying a third background. The three images 530b1, 530b2, 530b3 have different backgrounds, as different background images are used in the three instances of generating these images.

Figure 5K:
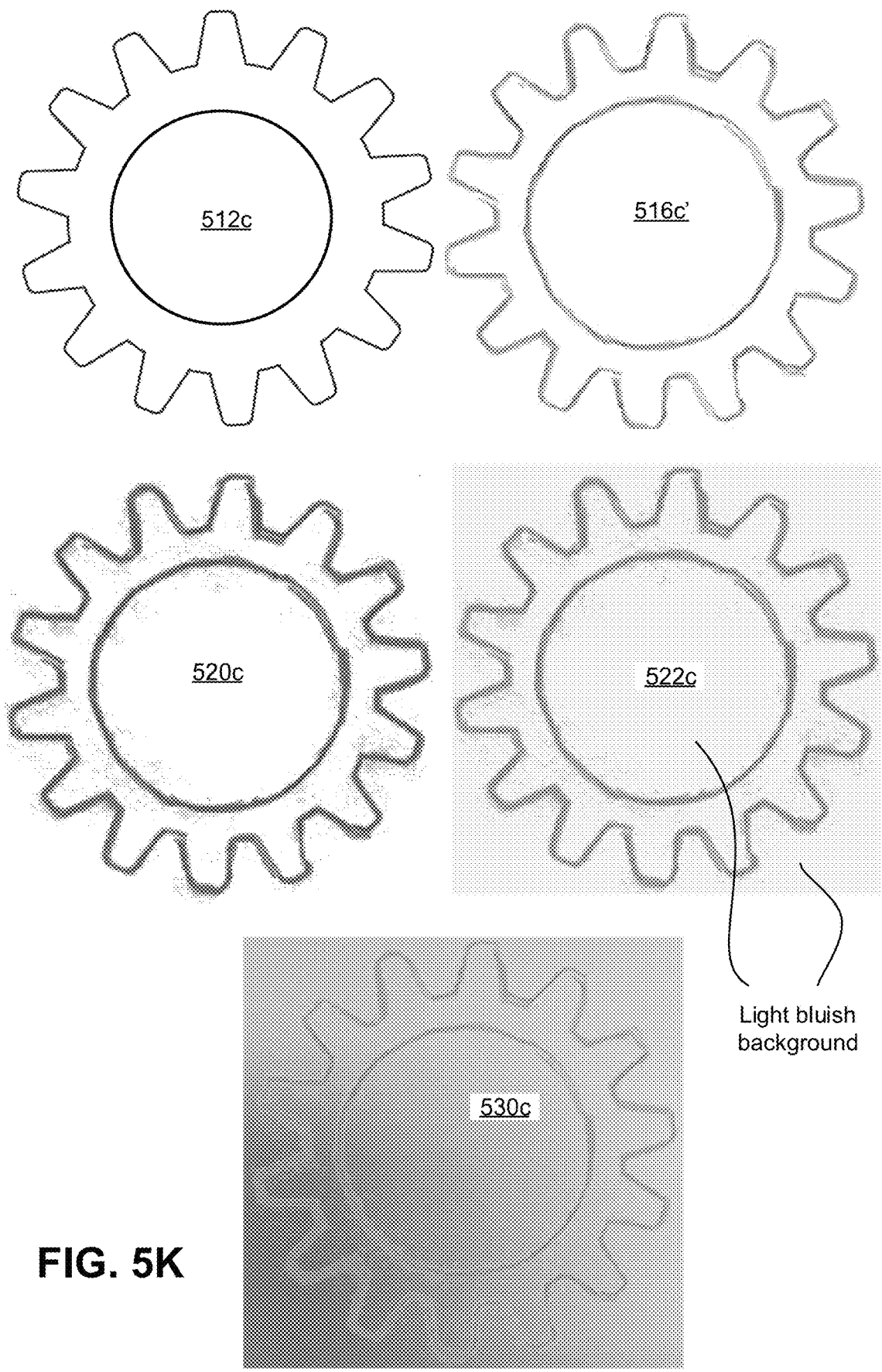

FIG. 5K illustrates various operations of the method 500 for a vector image 512c. For example, the patch synthesis module 272 synthesizes the raster image 516c' from the vector image 512c using operation 412 of the method 400. Thus, the raster image 516c' is synthesized from the raster image 512c based on a randomly selected image transformation of a pair of the style database (e.g., as discussed with respect to 408 of method 400) and then filtered (e.g., by the image filtering module 274) to add features such as sharpness, noise, and/or blur. Image 520c is generated by applying (e.g., by the background and lighting synthesis module 276) gamma correction for random amplification of noise. Image 522c is generated from image 520c, after per-color channel linear mapping (e.g., by the background and lighting synthesis module 276), which varies intensity of individual color channels. The final image 530c is generated from image 522c, after applying (e.g., by the background and lighting synthesis module 276) a randomly selected background composition to the image 522c. Thus, the synthetically generated raster image 530c (e.g., as generated by the training data generation system 270) represents a scanned or photographed copy of a likely hand-drawn sketch drawn using a random drawing media (e.g., pen, pencil, and/or other drawing media) and on a random drawing canvas (e.g., a colored paper, a fabric canvas, or another drawing canvas), where the artist's intention is likely to generate the image 512c. The final image 530c comprises salient features, as well as various auxiliary features. Put differently, the vector image 512c is a vector representation of the raster image 530c, where the vector image 512c includes the salient features (but not the auxiliary features) of the raster image 530c. The training dataset 280 includes a pair of images comprising the vector image 512c and the raster image 530c, and is used to train the sketch to vector image translation system 102 and/or system 202.

Thus, the method 400 is used to synthesize a large, labelled training dataset 280 of realistic sketches (e.g., raster images 530) aligned to digital content (e.g., vector images 512) that cover a wide range of real-world conditions. As variously discussed, the method 400 relies on a small set of artists-drawn sketches (e.g., sketches corresponding to the raster images 506) drawn in different styles and media (e.g., pen, pencil, charcoal, marker, and/or other drawing media), and their corresponding vector images (e.g., vector images 502) to stylize a large set of vector graphics. The distance fields (e.g., discussed with respect to FIG. 5E) in conjunction with patch-based sketch style transfer (e.g., discussed with respect to FIGS. 5D-5E) are to transfer artist's style to target graphics set, which is well suited for transferring stroke characteristics, to generate the final training dataset 280.

Figure 6:
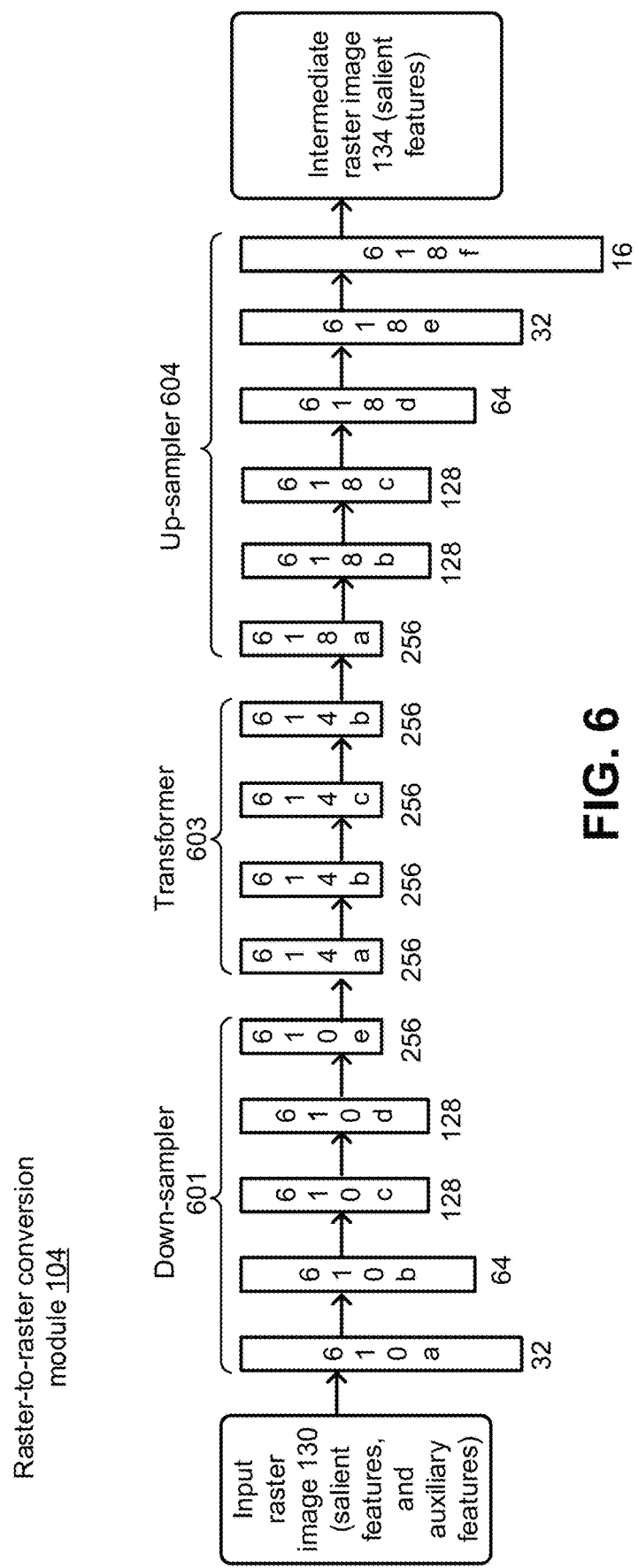
FIG. 6 illustrates a raster-to-raster conversion module included in a sketch to vector image translation system of FIGS. 1 and/or 2, in accordance with some embodiments of the present disclosure.

FIG. 6 illustrates the raster-to-raster conversion module 104 included in any of the sketch to vector image translation systems 102 and/or 202 of FIGS. 1-2, in accordance with some embodiments. As various discussed herein previously, the raster-to-raster conversion module 104 receives the input raster image 130, and generates the intermediate raster image 134 that preserves the salient features of the input raster image 130. The raster-to-raster conversion module 104 removes the auxiliary features (e.g., removes the non-salient features, blemishes, defects, watermarks, background, and/or other auxiliary features) from the input raster image 130.

In some embodiments, the raster-to-raster conversion module 104 comprises a machine learning network, such as a deep learning network, to clean input raster image 130, where the cleaning removes the auxiliary features form the input raster images 130 to generate the intermediate raster images 134. The raster-to-raster conversion module 104 performs the cleaning operation by formulating the cleaning operation as an image translation problem. The image translation problem is solved using deep learning, combining techniques such as sketch refinement and hole filling methods.

In some embodiments, the deep network of the raster-to-raster conversion module 104 comprises a deep adversarial network that takes as input a 3-channel RGB input image of arbitrary resolution, either a photograph or scan of an artist's sketch, such as the input raster image 130. The deep adversarial network generates a single-channel image of the same resolution that contains only the salient strokes (e.g., inking lines) implied by the sketch, such as the intermediate raster image 134. The deep adversarial network comprises a generator and a discriminator, where the generator of the raster-to-raster conversion module 104 is illustrated in FIG. 6.

In some embodiments, the generator uses a residual block architecture. In some embodiments, the discriminator uses a generative adversarial network (GAN), such as a SN-Patch-GAN. Both the generator and discriminator networks are fully convolutional and are jointly trained with the Adam optimizer, regularized by an exponential moving average optimizer for training stability. The training uses the training data 280 discussed herein previously.

In some embodiments, the generator has three sub-components: a down-sampler 601, a transformer 603, and an up-sampler 604. As illustrated in FIG. 6 and in some embodiments, the down-sampler 601 comprises five convolution layers with the following example structures. In the following example structures, a layer is denoted as [input shape, filter size, stride, number of output channels].

Convolution layer C0 610a: [3×W×H, (5,5), (2,2), 32]
Convolution layer C1 610b: [32×W/2×H/2, (3,3), (1,1), 64]
Convolution layer C2 610c: [64×W/2×H/2, (3,3), (2,2), 128]
Convolution layer C3 610d: [128×W/4×H/4, (3,3), (1,1), 128]
Convolution layer C4 610e: [128×W/4×H/4, (3,3), (2,2), 256]

In some embodiments, all convolution layers of the down-sampler, except for layers C0 and C4, are followed by instance normalization and all layers use exponential ReLU (ELU) for non-linearity. Thus, the convolution layer 610a receives the input raster image 130, the convolution layer 610b receives the output of the convolution layer 610a, and so on. In some embodiments, the down-sampler 601 learns low-resolution data from the input raster image 130, e.g., learns important features at lower resolution. The numbers at the bottom of each convolution layer in FIG. 6 indicates a corresponding number of output channels for that layer. Thus, layer 610a has 32 channels, layer 610b has 64 channels, and so on. As noted, the number of output channels increases or remains the same progressively. A physical size of a convolution layer in FIG. 6 is an indication of an image resolution of the convolution layer (although the sizes are not to the scale). Thus, as the number of output channels increases, the image resolution decreases. For example, the convolution layer 610a has the highest resolution among the five convolution layers of the down-sampler 601, and the convolution layer 610e has the lowest resolution among the five convolution layers of the down-sampler 601. Individual channels in individual convolution layers 610 in the down-sampler 601 aims to recognize and/or differentiate various salient features, auxiliary features, and/or non-white background of the input raster image 130.

In some embodiments, the transformer 603 comprises four residual blocks 614a, 614b, 614c, 614d, e.g., to avoid the problem of vanishing gradients. In some embodiments, individual blocks 614 accept and emit a tensor of the same shape (256×W/8×H/8). Also, using skip layers effectively simplifies the network and speeds learning, as there are fewer layers to propagate gradients through. The transformer 603 includes an encoder-decoder framework and performs processing at a higher dimension space, such as 256 channels, as will be appreciated.

In some embodiments, the up-sampler 604 restores the output back to the original resolution of the input raster image 130. As illustrated, in an example embodiment, the up-sampler 604 comprises six convolution layers 618a, . . . , 618f with following structures.

Convolution layer C0 618a: [256×W/4×H/4, (3,3), (1,1), 256]
Convolution layer C1 618b: [256×W/4×H/4, (3,3), (1,1), 128]
Convolution layer C2 618c: [128×W/2×H/2, (3,3), (1,1), 128]
Convolution layer C3 618d: [128×W/2×H/2, (3,3), (1,1), 64]
Convolution layer C4 618e: [64×W×H, (3,3), (1,1), 32]
Convolution layer C5 618f: [32×W×H, (3,3), (1,1), 16]

In some embodiments, all layers of the up-sampler 604 use 3×3 spatial filters with stride 1, and use ELU activation. In an example embodiment, layers C0, C2 and C4 are preceded by 2× up-sampling using nearest neighbor. The output of the up-sampler 604 is passed through a final convolution layer [16×W×H, (3,3), (1,1), 1] (not illustrated in FIG. 6) which does not use any activation.

In some embodiments, the discriminator (not illustrated in FIG. 6) has four convolution layers, which are followed by instance normalization and spectral normalization. The convolution layers have the following structure, for example.

Convolution layer C0: [3×W×H, (4,4), (2,2), 32]
Convolution layer C1: [32×W/2×H/2, (4,4), (2,2), 64]
Convolution layer C2: [64×W/4×H/4, (4,4), (2,2), 128]
Convolution layer C3: [128×W/8×H/8, (4,4), (2,2), 256]

In an example, all convolution layers of the discriminator use 4×4 spatial filter with stride 2, and Leaky ReLU as the activation function. In addition to these, a final PatchGAN layer (with no activation function) is used as it enforces more constraints that encourage sharp high-frequency detail. In some embodiments, the discriminator ensures that the intermediate raster image 134 is a realistic representation of the input raster image 130. For example, the discriminator checks as to whether the intermediate raster image 134 is valid or invalid.

In some embodiments, in order to train the generator network to learn salient strokes (e.g., inking lines), "Min Pooling Loss" is used as a component of generator loss function. Overall, the generator loss function has, in an example, one or more of the following three components: pixel loss $L_{pix}$, adversarial loss $L_{adv}$, and min-polling loss $L_{pool}$.

In an example, the pixel loss $L_{pix}$ is per-pixel $L_1$ norm of a difference between (i) an output vector image that is output by the system 102 in response to receiving a synthetically generated raster image 530 and (ii) a corresponding ground-truth vector image 512 of the training data 280 (e.g., where the raster image 530 is synthetically generated from the ground-truth vector image 512). For example, as discussed with respect to FIGS. 3-5K, the training data 280 has a plurality of pairs of images, where each pair comprises a ground-truth vector image 512 and a corresponding synthetically generated raster image 530. Assume a raster image 530a is input to the system 102, which outputs an output vector image X—then the pixel loss is the per-pixel $L_1$ norm of the difference between (i) the output vector image X and (ii) a corresponding ground-truth vector image 512a that was used to generate the raster image 530a.

The adversarial loss $L_{adv}$ uses hinge loss as adversarial component of the loss function. For the generator, adversarial loss $L_{adv}$ is defined as:

$$L_{Adv}^G = -E_{z \sim P_z, y \sim Pdata} D(G(z), y) \qquad \text{Equation 5}$$

The $L_{Adv}^G$ is the adversarial loss for the generator network, E refers to expectation, z is a random noise vector, y represents ground truth data, D is a function representing the discriminator network, G is a function representing the generator network, Pz and Pdata are distributions of random noise vector and ground truth respectively.

The discriminator hinge loss $L_{adv}^G$ is given by:

$$L_{Adv}^G = -E_{(x,y) \sim Pdata}[\min(0, -1 + D(x, y)] - E_{z \sim Pz, y \sim Pdata} [\min(0, -1 - D(G(z), y))] \qquad \text{Equation 6}$$

The third component of the loss function is the Min-pooling loss $L_{pool}$. This loss is computed by taking the output of the generator and the ground truth. For example, assume that the training data 280 comprises a pair of images including ground truth vector image 512a and a corresponding synthetically generated raster image 530a. When the raster image 530a is input to the sketch to vector image transformation system 102, let the output be a vector image 531a. Ideally, the vector image 531a should match with the ground truth vector image 512a. In some embodiments, the Min-pooling loss $L_{pool}$ loss is computed by taking the output vector image 531a and the ground truth vector image 512a, with, for example, "1" indicating the background and "0" indicating the inked curve in the two images. Thus, individual pixels in the background region is assigned a value of 1, and individual pixels in the inked curve region is assigned a value of 0 in both images. Then min pooling is applied multiple times (e.g., three times) to each image. After each iteration of min pooling, the L1 distance between the two images are computed as loss. This correlates with a minimum bound on the distance to the curve at different resolutions and improves convergence behavior for sketches (e.g., compared to simpler approaches such as comparing down-sampled images or more complex approaches such as using perceptual loss pretrained on image classification). It may be noted that the Min-pooling loss $L_{pool}$ with "1" indicating the background and "0" indicating the inked curve is equivalent to a Max-pooling loss with "0" indicating the background and "1" indicating the inked curve.

The final loss function of the generator of the raster-to-raster conversion module 104 of the sketch to vector image transformation system 102 is given by:

$$L_G = w_{pix} \cdot L_{pix} + w_{adv} \cdot L_{adv} + w_{pool} \cdot L_{pool}, \qquad \text{Equation 7}$$

where $w_{pix}$, $w_{adv}$, $w_{pool}$ are respective configurable weights for the pixel loss $L_{pix}$, adversarial loss $L_{adv}$, and min-polling loss $L_{pool}$.

As discussed with respect to FIGS. 1 and 2, once the raster-to-raster conversion module 104 generates the intermediate raster image 134, the raster-to-vector conversion module 108 receives the intermediate raster image 134 and generates the output vector image 138. In some embodiments, the raster-to-vector conversion module 108 can be implemented using an appropriate image translation module that receives a raster image, and generates a corresponding vector image.

Figure 7:
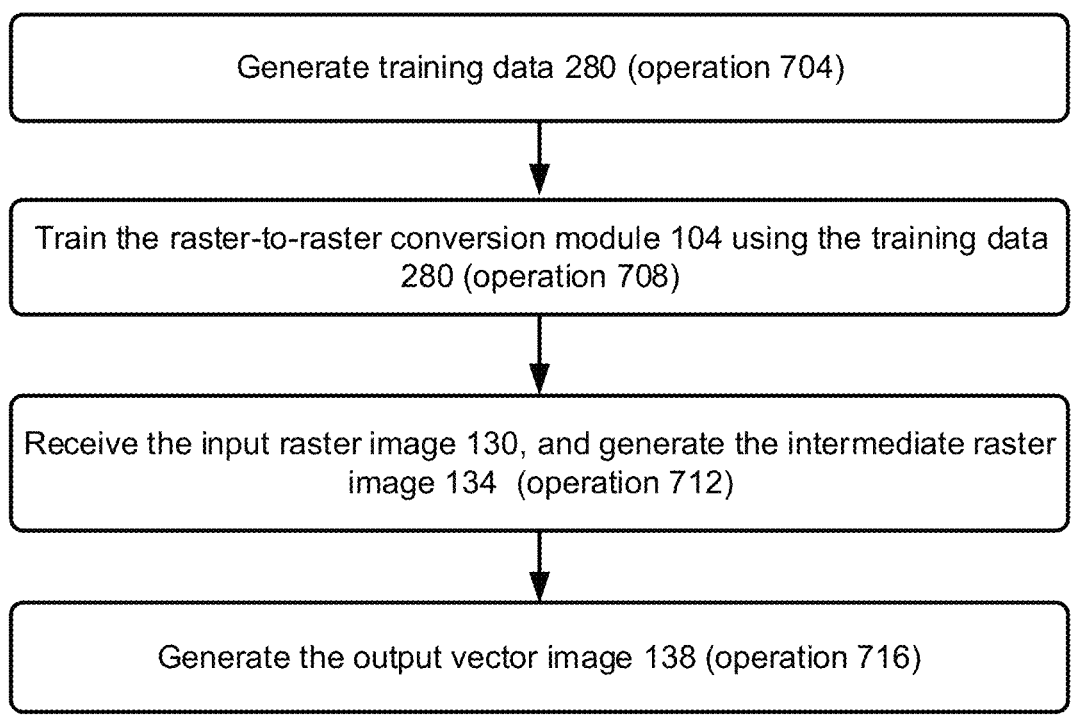
FIG. 7 is a flowchart illustrating an example method for transforming an input raster image of a hand-drawn sketch comprising salient features and auxiliary features to an output vector image comprising the salient features, in accordance with some embodiments of the present disclosure.

FIG. 7 is a flowchart illustrating an example method 700 for transforming an input raster image 130 of a hand-drawn sketch or a hand-drawn line drawing comprising salient features and auxiliary features to an output vector image 138 comprising the salient features, in accordance with some embodiments. Method 700 can be implemented, for example, using the system architecture illustrated in FIGS. 1-3, and described herein. However other system architectures can be used in other embodiments, as apparent in light of this disclosure. To this end, the correlation of the various functions shown in FIG. 7 to the specific components and functions illustrated in FIGS. 1-3 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate generation of the training data 280, and a second server may transform the input raster image 130 to the output vector image 138. Thus, although various operations of the method 700 are discussed herein as being performed by the device 100 and/or the server 201, one or more of these operations can also be performed by any other server or by the device 100.

The method 700 comprises, at 704, generating training data 280 (e.g., by the sketch to vector image translation system 202), details of which has been discussed with respect to method 400 of FIG. 4 and also discussed with respect to FIGS. 5A-5K.

At 708, the raster-to-raster conversion module 104 is trained using the training data 280. For example, the loss functions discussed with respect to equation 7 are used to train the raster-to-raster conversion module 104.

At 712, the input raster image 130 is received at the trained raster-to-raster conversion module 104, which generates the intermediate raster image 134, e.g., as discussed with respect to FIG. 6. For example, the input raster image 130 includes salient lines, as well as one or more auxiliary features such as non-white and/or non-uniform background, non-uniform lighting condition, non-salient lines, etc. The intermediate raster image 134 includes the salient lines, but lacks one or more of the auxiliary features. For example, the intermediate raster image 134 lacks one or more non-salient lines, and/or has white background and/or uniform lighting condition.

At 716, the raster-to-vector conversion module 108 receives the intermediate raster image 134, and generates the output vector image 138. As variously discussed, the raster-to-vector conversion module 108 can be implemented using an appropriate image translation module that receives a raster image, and generates a corresponding vector image.

Figure 8:
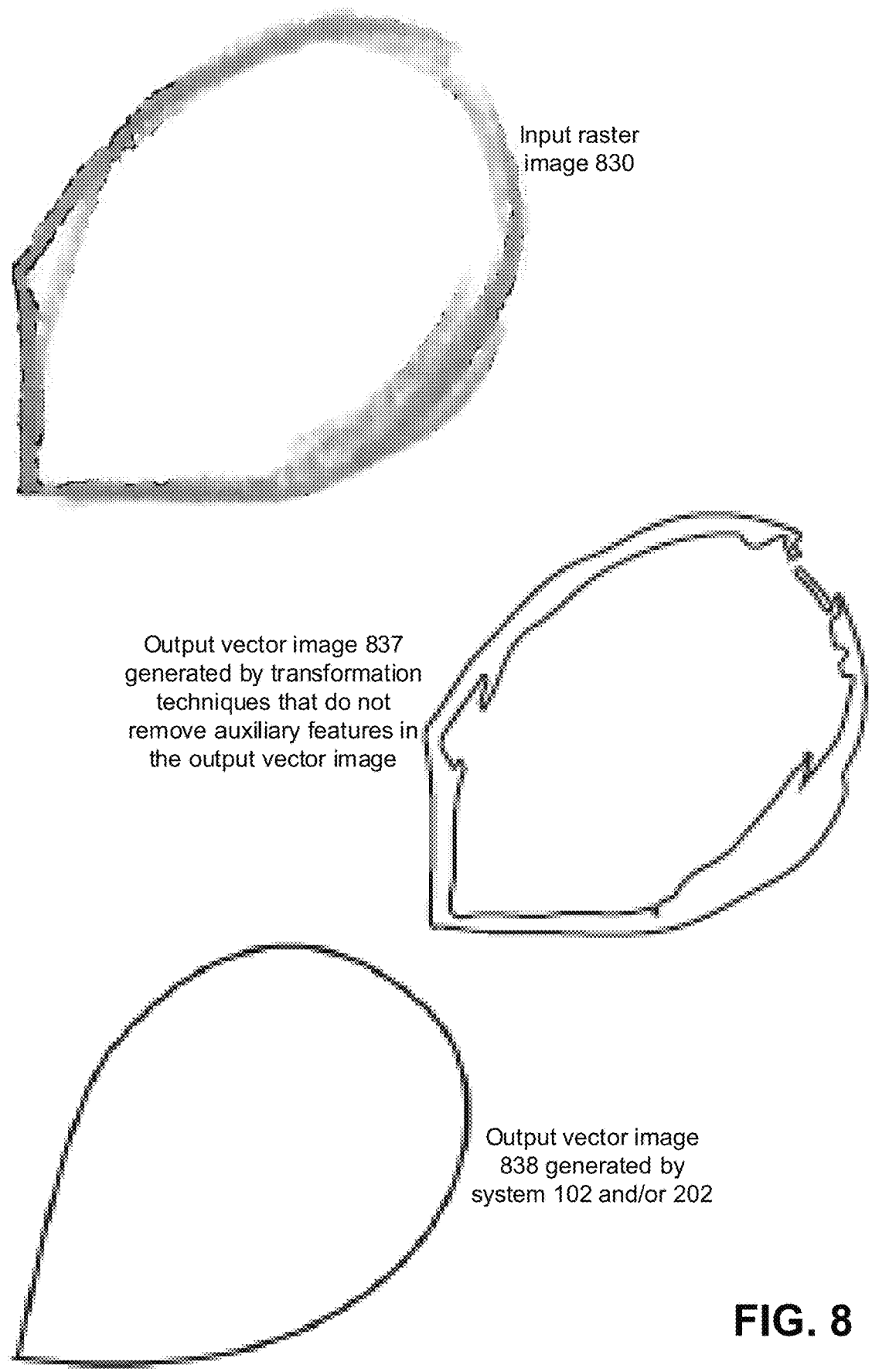
FIG. 8 is a comparison between (i) a first output vector image generated by a transformation technique that does not remove auxiliary features from the output vector image, and (ii) a second output vector image generated by a sketch to vector image transformation system discussed herein, in accordance with some embodiments.

FIG. 8 is a comparison between (i) a first output vector image 837 generated by transformation techniques that does not remove auxiliary features from the output vector image, and (ii) a second output vector image 838 generated by the sketch to vector image transformation systems 102 and/or 202 discussed herein, in accordance with some embodiments. FIG. 8 illustrates a magnified version of an input raster image 830 that is to be converted to a vector image, where the input raster image 830 is a scanned or photographed version of a hand-sketch drawn by an artist. As illustrated, the input raster image 830 has multiple strokes, i.e., salient and non-salient lines. The output vector image 837 is generated by transformation techniques that does not remove auxiliary features in the output vector image—hence, the output vector image 837 includes both salient and non-salient lines. In contrast, the output vector image 838 is generated by the sketch to vector image transformation systems 102 and/or 202 discussed herein, which removes auxiliary features, such as non-salient lines, from the output vector image 838. Thus, the output vector image 838 is likely a true representation of the artist's intent. For example, the artist is unlikely to have intended double lines in the output vector image 837, and is likely to have intended the simpler, single lines of the output vector image 838. Thus, the sketch to vector image transformation systems 102 and/or 202 are likely to generate vector images that output true representation of the artists' intents.

Numerous variations and configurations will be apparent in light of this disclosure and the following examples.

Example 1. A method for generating an output vector image from a raster image of a sketch, the method comprising: receiving an input raster image of the sketch, the input raster image comprising a first line that is partially overlapping and adjacent to a second line, and one or both of a non-white background on which the plurality of lines are drawn and a non-uniform lighting condition; identifying, by a deep learning network and in the input raster image, the first line as a salient line, and the second line as a non-salient line; generating, by the deep learning network, an intermediate raster image that includes the first line, but not the second line, and one or both of a white background and a uniform lighting condition; and converting the intermediate raster image to the output vector image.

Example 2. The method of example 1, wherein the input raster image further includes one or more of a blemish, a defect, a watermark, and/or the non-white background, and the intermediate raster image does not include any of the blemish, defect, watermark, or non-white background.

Example 3. The method of any of examples 1-2, wherein the input raster image includes both of the non-white background and the non-uniform lighting condition, and the intermediate raster image includes both of the white background and the uniform lighting condition.

Example 4. The method of any of examples 1-3, wherein prior to receiving the input raster image, the method further comprises training the deep learning network, the training comprising: synthesizing a plurality of training raster images from a plurality of training vector images; and training the deep learning network using the plurality of training raster images and the plurality of training vector images.

Example 5. The method of any of examples 1-3, wherein prior to receiving the input raster image, the method further comprises training the deep learning network, the training comprising: generating training data for training the deep learning network, wherein generating the training data comprises generating a sketch style dataset comprising a plurality of image pairs, each image pair including a vector image and a corresponding raster image, wherein the raster image of each image pair is a scanned or photographed version of a corresponding hand-drawn sketch that mimics the vector image of that image pair, and synthesizing a training raster image from a corresponding training vector image, based at least in part on a stroke style analogy of an image pair of the sketch style dataset, such that the synthesized training raster image has a stroke style that that mimics a stroke style of the image pair of the sketch style dataset; and training the deep learning network using the training data.

Example 6. The method of any of examples 1-5, wherein the deep learning network comprises a generator and a discriminator, wherein the generator uses a residual block architecture, and the discriminator uses a generative adversarial network (GAN).

Example 7. The method of example 6, wherein the generator comprises: a down-sampler comprising a first plurality of convolution layers; a transformer comprising a second plurality of convolution layers; and an up-sampler comprising a third plurality of convolution layers.

Example 8. The method of any of examples 6-7, wherein the generator is trained using training data comprising (i) a plurality of training vector images and (ii) a plurality of training raster images synthesized from the plurality of training vector images, and wherein prior to receiving the input raster image, the method further comprises: generating a loss function to train the generator, the loss function comprising one or more of a pixel loss that is based at least in part on per-pixel L1 norm of difference between (i) a first training vector image of the plurality of training vector images, and (ii) a second vector image generated by the deep learning network from a first training raster image of the plurality of training raster images, wherein the first training raster image of the training data is synthesized from the first training vector image of the training data, the first training vector image being a ground truth image, an adversarial loss based on a hinge loss of the discriminator, and/or a minimum (Min)-pooling loss.

Example 9. The method of example 8, wherein generating the loss function comprises generating the Min-pooling loss by: assigning, to individual pixels in each of the first training vector image and the second vector image, a value of "1" for background and a value of "0" for inked curve; and subsequent to assigning the values, applying min-pooling one or more times to each of the first training vector image and the second vector image.

Example 10. The method of example 9, wherein generating the loss function comprises generating the Min-pooling loss by: subsequent to applying the min-pooling, generating the Min-pooling loss based on a L1 distance between the first vector image and the second vector image.

Example 11. A method for generating training data for training a deep learning network to output a vector image based on an input raster image of a sketch, the method comprising: generating a sketch style dataset comprising a plurality of image pairs, each image pair including a vector image and a corresponding raster image, wherein the raster image of each image pair is a scanned or photographed version of a corresponding sketch that mimics the vector image of that image pair; and synthesizing a training raster image from a corresponding training vector image, based at least in part on a stroke style analogy of an image pair of the sketch style dataset, such that the synthesized training raster image has a stroke style that is analogous to a stroke style of a raster image of an image pair of the sketch style dataset.

Example 12. The method of example 11, further comprising: applying an image filter to add one or more effects to the synthesized training raster image.

Example 13. The method of example 12, wherein the one or more effects includes sharpness, noise and/or blur.

Example 14. The method of any of examples 12-13, further comprising: applying background and lighting conditions to the synthesized training raster image.

Example 15. The method of example 14, wherein applying the background and the lighting condition comprises: randomly amplifying noise in the synthesized training raster image, by performing a gamma correction of the synthesized training raster image; and shifting intensity of one or more color channels of the synthesized training raster image.

Example 16. The method of any of examples 14-15, wherein applying the background and the lighting condition comprises: randomly selecting a background from a candidate set of backgrounds; and adding the randomly selected background to the synthesized training raster image.

Example 17. The method of any of examples 14-16, wherein the training data includes a plurality of training image pairs, and one of the training image pairs includes (i) the training vector image, and (ii) the synthesized training raster image, with the background and lighting condition applied to the synthesized training raster image.

Example 18. A system for converting an input raster image to a vector image, the input raster image including a plurality of salient lines and a plurality of auxiliary features, the system comprising: one or more processors; a raster-to-raster conversion module executable by the one or more processors to receive the input raster image, and generate an intermediate raster image that includes the plurality of salient lines and lacks the plurality of auxiliary features; and a raster-to-vector conversion module executable by the one or more processors to convert the intermediate raster image to the output vector image.

Example 19. The system of example 18, wherein the raster-to-raster conversion module comprises the deep learning network that includes a generator and a discriminator, wherein the generator uses a residual block architecture, and the discriminator uses a generative adversarial network (GAN).

Example 20. The system of example 19, wherein the generator comprises: a down-sampler comprising a first plurality of convolution layers and to recognize salient features, auxiliary features, and/or a non-white background of the input raster image at one or more image resolutions; a transformer having an encoder-decoder framework comprising a second plurality of convolution layers and to perform processing of features recognized by the down-sampler at a higher dimension space; and an up-sampler comprising a third plurality of convolution layers and to restore resolution to that of the input raster image.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for generating an output vector image from a raster image of a sketch, the method comprising:
   receiving an input raster image of the sketch, the input raster image comprising a first line that is partially overlapping and adjacent to a second line, and one or both of a non-white background on which the plurality of lines are drawn and a non-uniform lighting condition;
   identifying, by a deep learning network and in the input raster image, the first line as a salient line, and the second line as a non-salient line;
   generating, by the deep learning network, an intermediate raster image that includes the first line, but not the second line, and one or both of a white background and a uniform lighting condition; and
   converting the intermediate raster image to the output vector image.

2. The method of claim 1, wherein the input raster image further includes one or more of a blemish, a defect, a watermark, and/or the non-white background, and the intermediate raster image does not include any of the blemish, defect, watermark, or non-white background.

3. The method of claim 1, wherein the input raster image includes both of the non-white background and the non-uniform lighting condition, and the intermediate raster image includes both of the white background and the uniform lighting condition.

4. The method of claim 1, wherein prior to receiving the input raster image, the method further comprises training the deep learning network, the training comprising:
   synthesizing a plurality of training raster images from a plurality of training vector images; and
   training the deep learning network using the plurality of training raster images and the plurality of training vector images.

5. The method of claim 1, wherein prior to receiving the input raster image, the method further comprises training the deep learning network, the training comprising:
   generating training data for training the deep learning network, wherein generating the training data comprises
      generating a sketch style dataset comprising a plurality of image pairs, each image pair including a vector image and a corresponding raster image, wherein the raster image of each image pair is a scanned or photographed version of a corresponding hand-drawn sketch that mimics the vector image of that image pair, and
      synthesizing a training raster image from a corresponding training vector image, based at least in part on a stroke style analogy of an image pair of the sketch style dataset, such that the synthesized training raster image has a stroke style that that mimics a stroke style of the image pair of the sketch style dataset; and
   training the deep learning network using the training data.

6. The method of claim 1, wherein the deep learning network comprises a generator and a discriminator, wherein the generator uses a residual block architecture, and the discriminator uses a generative adversarial network (GAN).

7. The method of claim 6, wherein the generator comprises:
- a down-sampler comprising a first plurality of convolution layers;
- a transformer comprising a second plurality of convolution layers; and
- an up-sampler comprising a third plurality of convolution layers.

8. The method of claim 6, wherein the generator is trained using training data comprising (i) a plurality of training vector images and (ii) a plurality of training raster images synthesized from the plurality of training vector images, and wherein prior to receiving the input raster image, the method further comprises:
- generating a loss function to train the generator, the loss function comprising one or more of
  - a pixel loss that is based at least in part on per-pixel $L_1$ norm of difference between (i) a first training vector image of the plurality of training vector images, and (ii) a second vector image generated by the deep learning network from a first training raster image of the plurality of training raster images, wherein the first training raster image of the training data is synthesized from the first training vector image of the training data, the first training vector image being a ground truth image,
  - an adversarial loss based on a hinge loss of the discriminator, and/or
  - a minimum (Min)-pooling loss.

9. The method of claim 8, wherein generating the loss function comprises generating the Min-pooling loss by:
- assigning, to individual pixels in each of the first training vector image and the second vector image, a value of "1" for background and a value of "0" for inked curve; and
- subsequent to assigning the values, applying min-pooling one or more times to each of the first training vector image and the second vector image.

10. The method of claim 9, wherein generating the loss function comprises generating the Min-pooling loss by:
- subsequent to applying the min-pooling, generating the Min-pooling loss based on a $L_1$ distance between the first vector image and the second vector image.

11. A system for converting an input raster image to a vector image, the input raster image including a plurality of salient lines and a plurality of auxiliary features, the system comprising:
- one or more processors;
- a raster-to-raster conversion module executable by the one or more processors to receive the input raster image, and generate an intermediate raster image that includes the plurality of salient lines and lacks the plurality of auxiliary features; and
- a raster-to-vector conversion module executable by the one or more processors to convert the intermediate raster image to the output vector image.

12. The system of claim 11, wherein the raster-to-raster conversion module comprises the deep learning network that includes a generator and a discriminator, wherein the generator uses a residual block architecture, and the discriminator uses a generative adversarial network (GAN).

13. The system of claim 12, wherein the generator comprises:
- a down-sampler comprising a first plurality of convolution layers and to recognize salient features, auxiliary features, and/or a non-white background of the input raster image at one or more image resolutions;
- a transformer having an encoder-decoder framework comprising a second plurality of convolution layers and to perform processing of features recognized by the down-sampler at a higher dimension space; and
- an up-sampler comprising a third plurality of convolution layers and to restore resolution to that of the input raster image.

* * * * *